United States Patent [19]

Battlogg

[11] Patent Number: 5,537,705
[45] Date of Patent: Jul. 23, 1996

[54] WINDSCREEN WIPER SYSTEM WITH BLADE CAPABLE OF MOVING IN A SWIVELLING AND PARALLEL MANNER RELATIVE TO THE WIPER ARM

[76] Inventor: Stefan Battlogg, Haus Nr. 26, A-6771 St.Anton im Montafon, Austria

[21] Appl. No.: 253,198

[22] Filed: Jun. 1, 1994

Related U.S. Application Data

[63] Continuation of Ser. No. 32,417, Mar. 15, 1993, abandoned, which is a continuation of Ser. No. 613,663, filed PCT/AT90/00023, Mar. 28, 1990, published as WO90/11209, Oct. 4, 1990, abandoned.

[30] Foreign Application Priority Data

Mar. 29, 1989 [AT] Austria ................................. A717/89

[51] Int. Cl.⁶ ................................. B60S 1/36; B60S 1/44; B60S 1/70
[52] U.S. Cl. ................................. 15/250.71; 15/250.73; 15/250.16; 15/25.30; 15/250.25
[58] Field of Search ................................. 15/250.23, 250.21, 15/250.19, 250.29, 250.35, 250.30, 250.16, 250.17, 250.31, 250.25

[56] References Cited

U.S. PATENT DOCUMENTS

| | | | |
|---|---|---|---|
| 2,079,399 | 5/1937 | Drew et al. | 15/250.23 |
| 2,279,983 | 4/1942 | Goode et al. | 15/250.23 |
| 2,607,065 | 8/1952 | Dahlgren | 15/250.23 |
| 2,624,904 | 1/1953 | Wianco | 15/250.23 |
| 2,738,536 | 3/1956 | Spencer, Jr. | 15/250.23 |
| 2,790,195 | 4/1957 | Wrobel | 15/250.23 |
| 3,688,334 | 9/1972 | Peterson | 15/250.21 |
| 3,831,219 | 8/1924 | Deutscher | 15/250.23 |
| 4,040,141 | 8/1977 | O'Steen | 15/250.19 |
| 4,447,928 | 5/1984 | Schuch et al. | 15/250.21 |
| 4,782,548 | 11/1988 | Wong | 15/250.21 |

FOREIGN PATENT DOCUMENTS

| | | | |
|---|---|---|---|
| 1066859 | 11/1979 | Canada | 15/250.23 |
| 7417908 | 12/1974 | France . | |
| 2507314 | 9/1976 | Germany | 15/250.23 |
| 2840203 | 9/1978 | Germany . | |
| 3315126 | 10/1984 | Germany . | |
| 3411160 | 10/1985 | Germany . | |
| 3416466 | 11/1985 | Germany . | |
| 3435475 | 4/1986 | Germany . | |
| 3627035 | 2/1988 | Germany . | |
| 3641551 | 6/1988 | Germany . | |
| 0218192 | 4/1987 | Italy . | |
| 0236757 | 9/1987 | Italy . | |

OTHER PUBLICATIONS

GB-A 2225218.

*Primary Examiner*—Gary K. Graham
*Attorney, Agent, or Firm*—Hale and Dorr

[57] ABSTRACT

A windscreen wiper system has a wiper arm provided with a swivelling drive, a pivot bearing for a wiper blade being provided on the free end part of said wiper arm. The wiper blade can be moved into a rest position in the region of the lower edge of the windscreen in which it lies approximately parallel to the wiper arm. A control mechanism associated with the swivelling drive ensures parallel guiding of the rotary wiper blade and has a control element fastened to the vehicle with which a scanning element belonging to the wiper arm is associated. For transition into the rest position, a device for change-over from parallel to swivelling guiding of the wiper blade is provided. This comprises an adjusting drive which places the control mechanism out of action in a central working position and stops the rotary drive of the wiper blade.

33 Claims, 10 Drawing Sheets

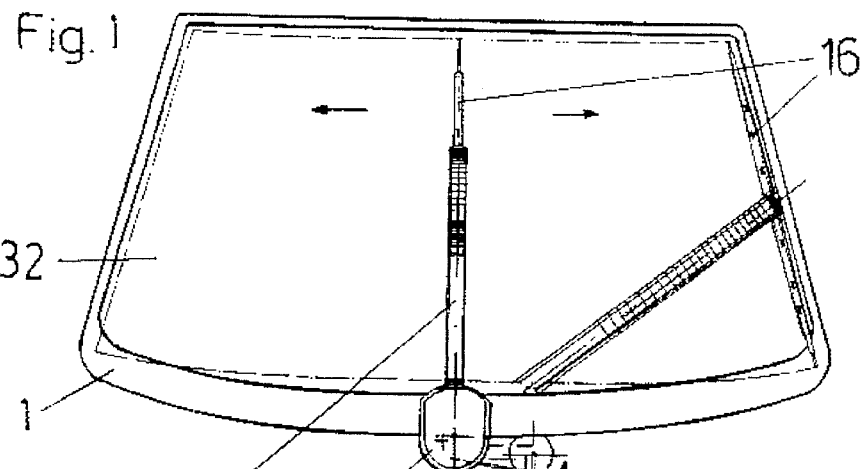
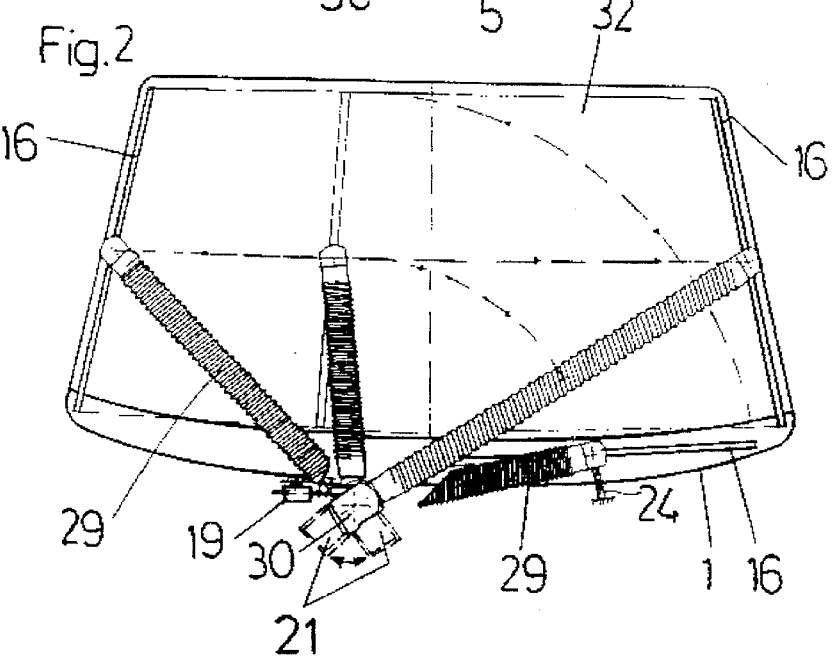
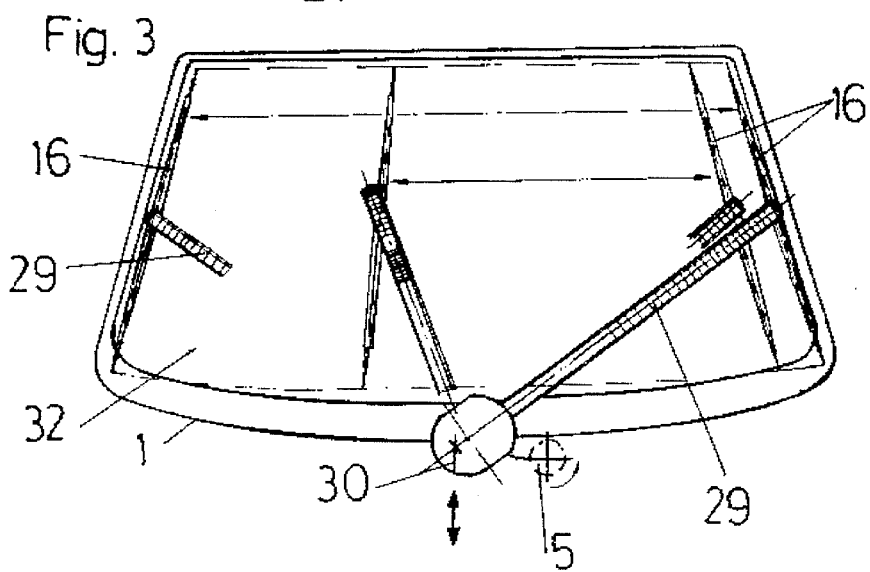

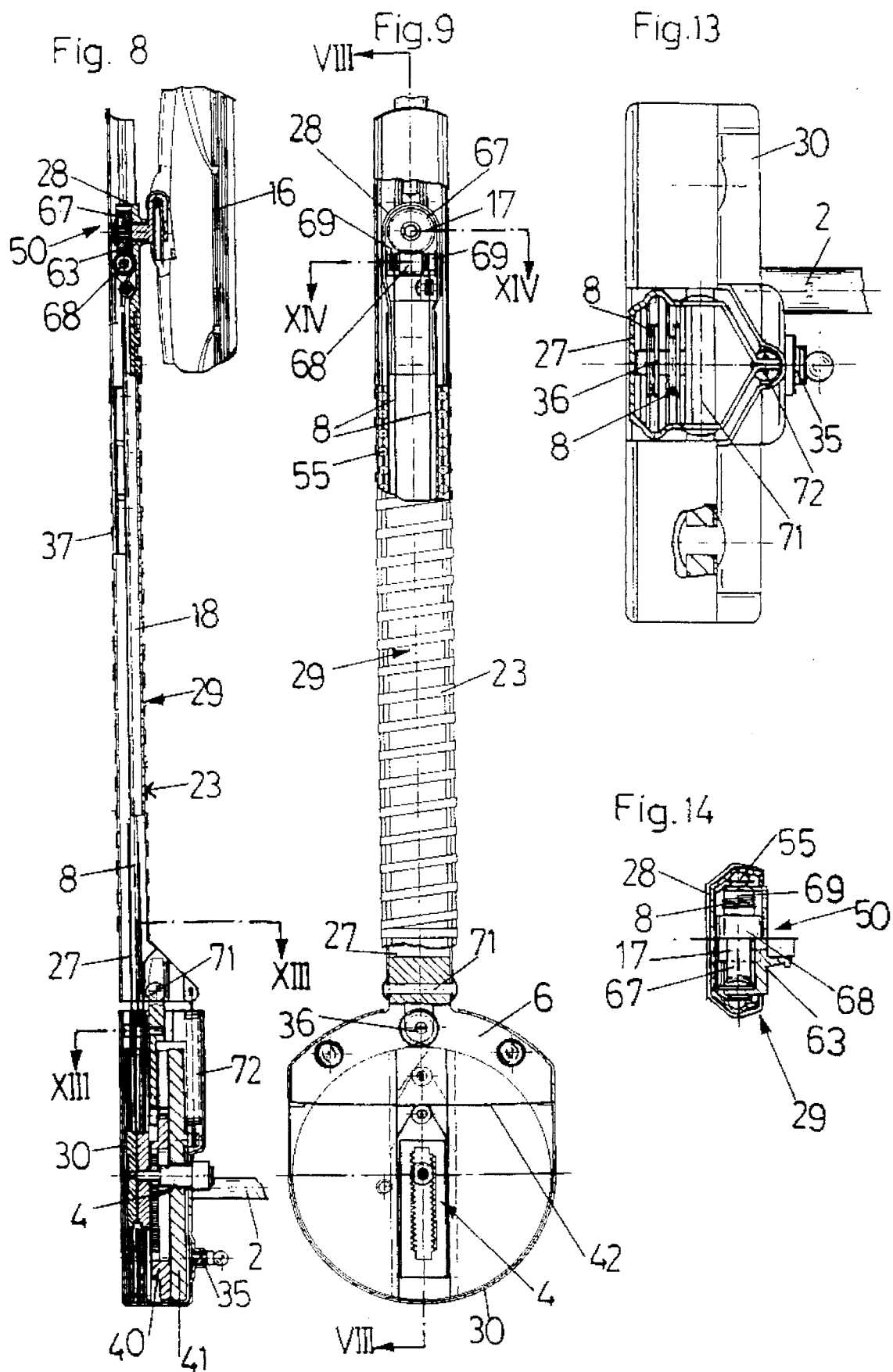

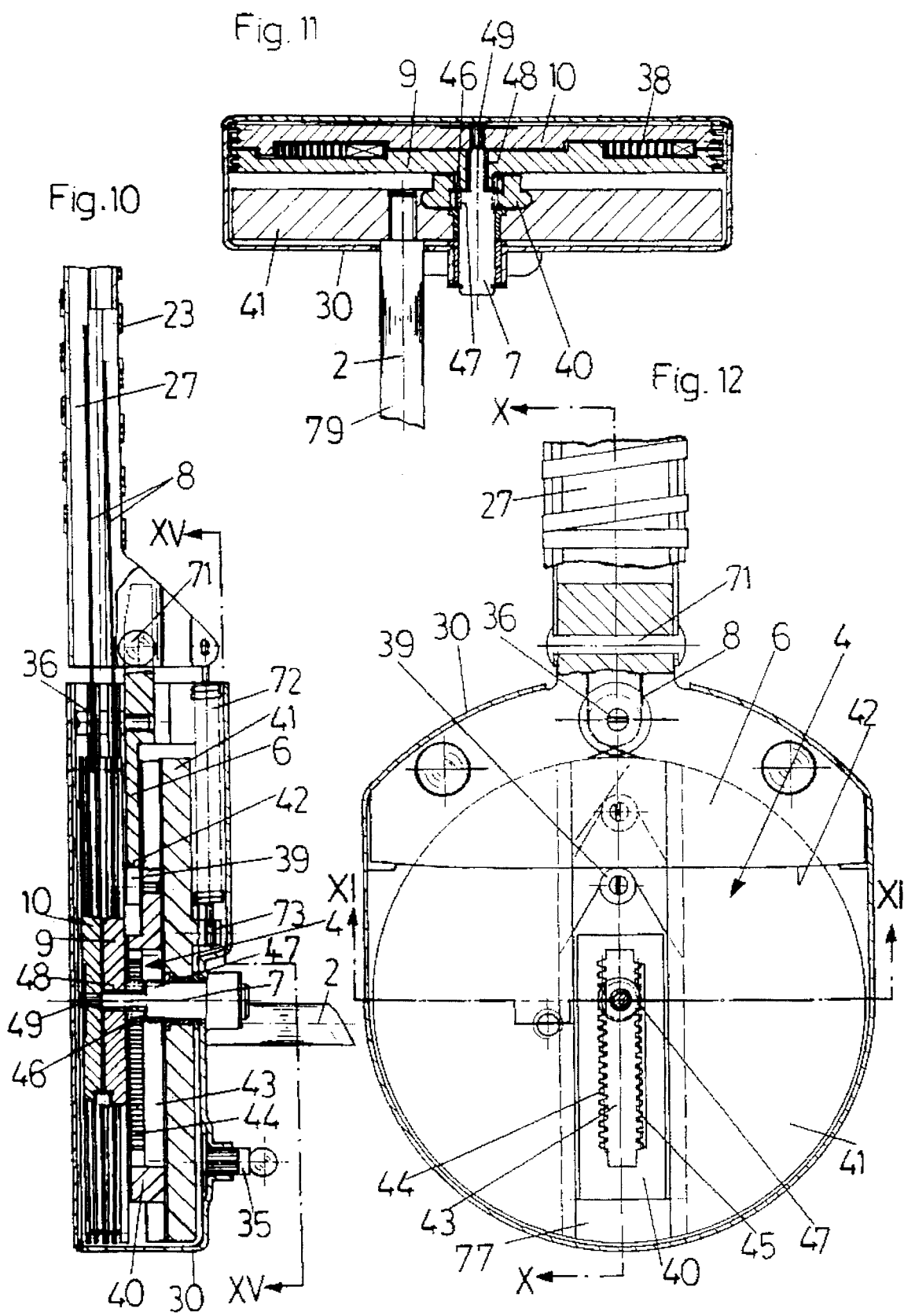

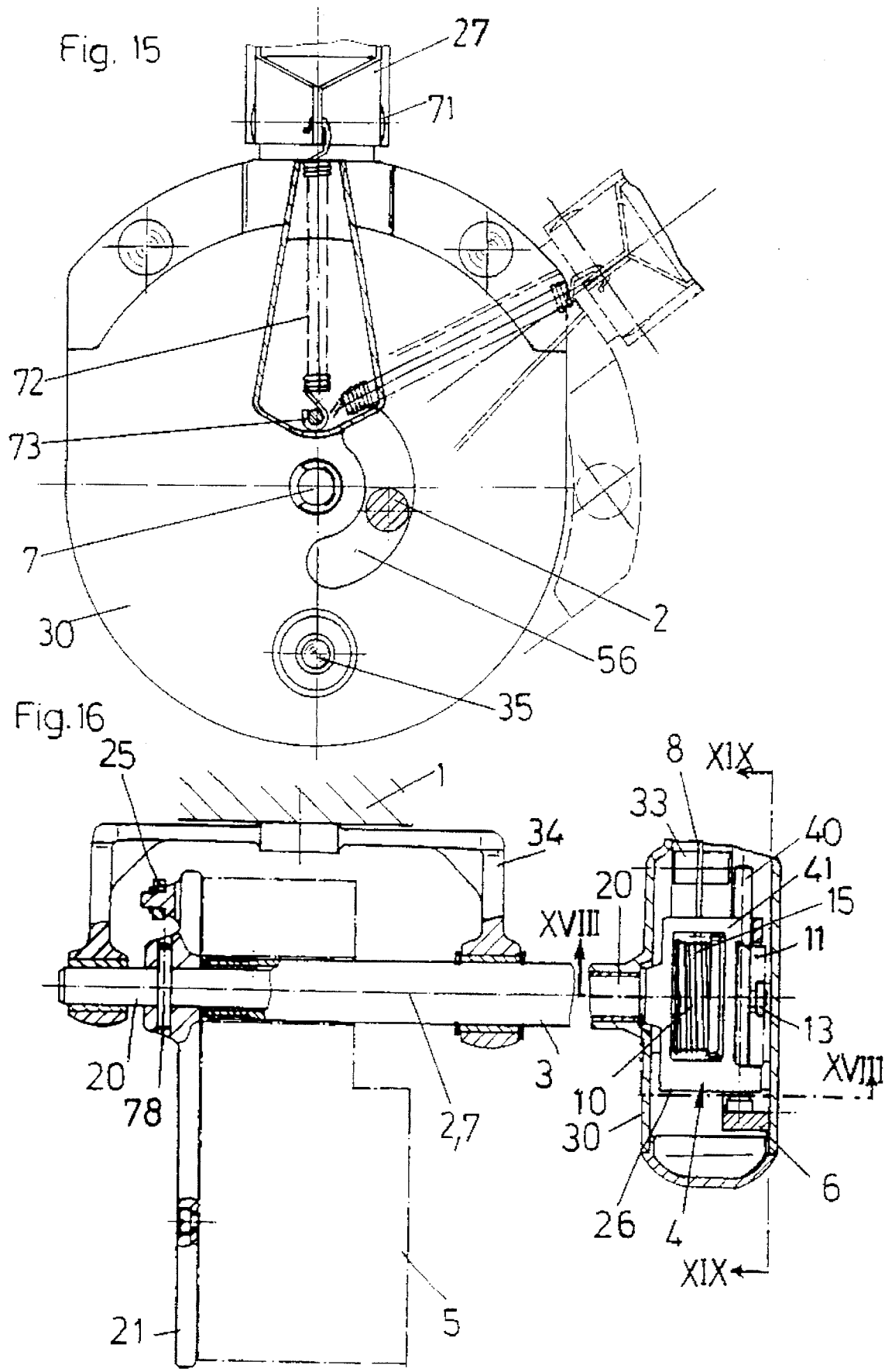

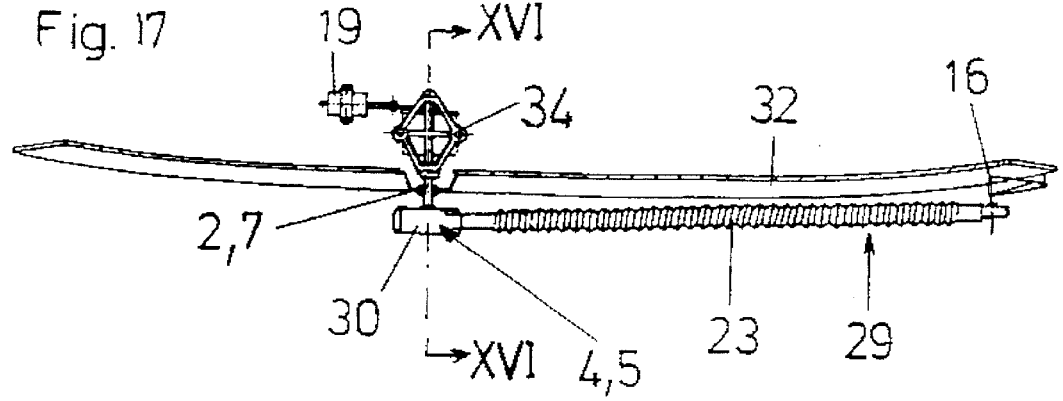
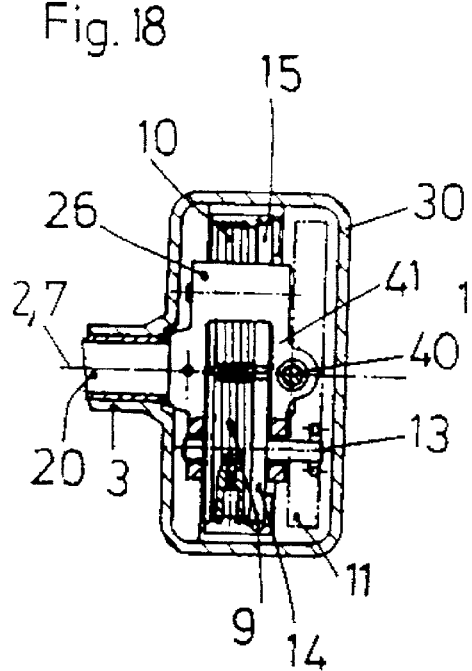
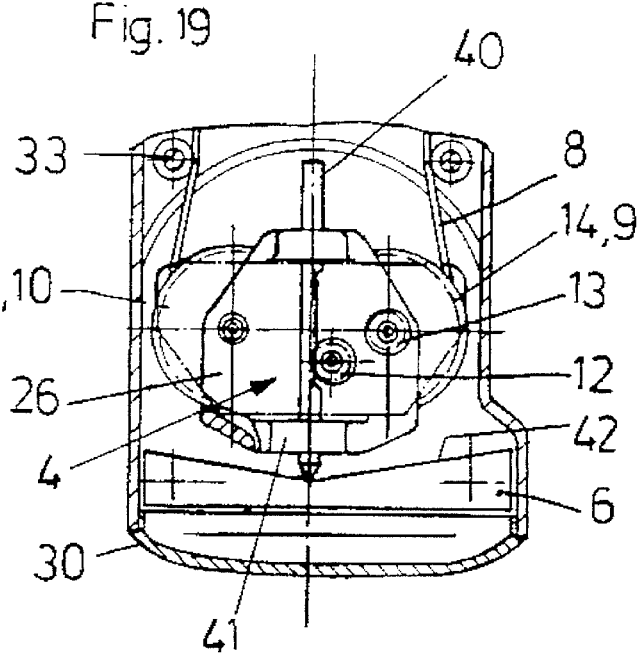

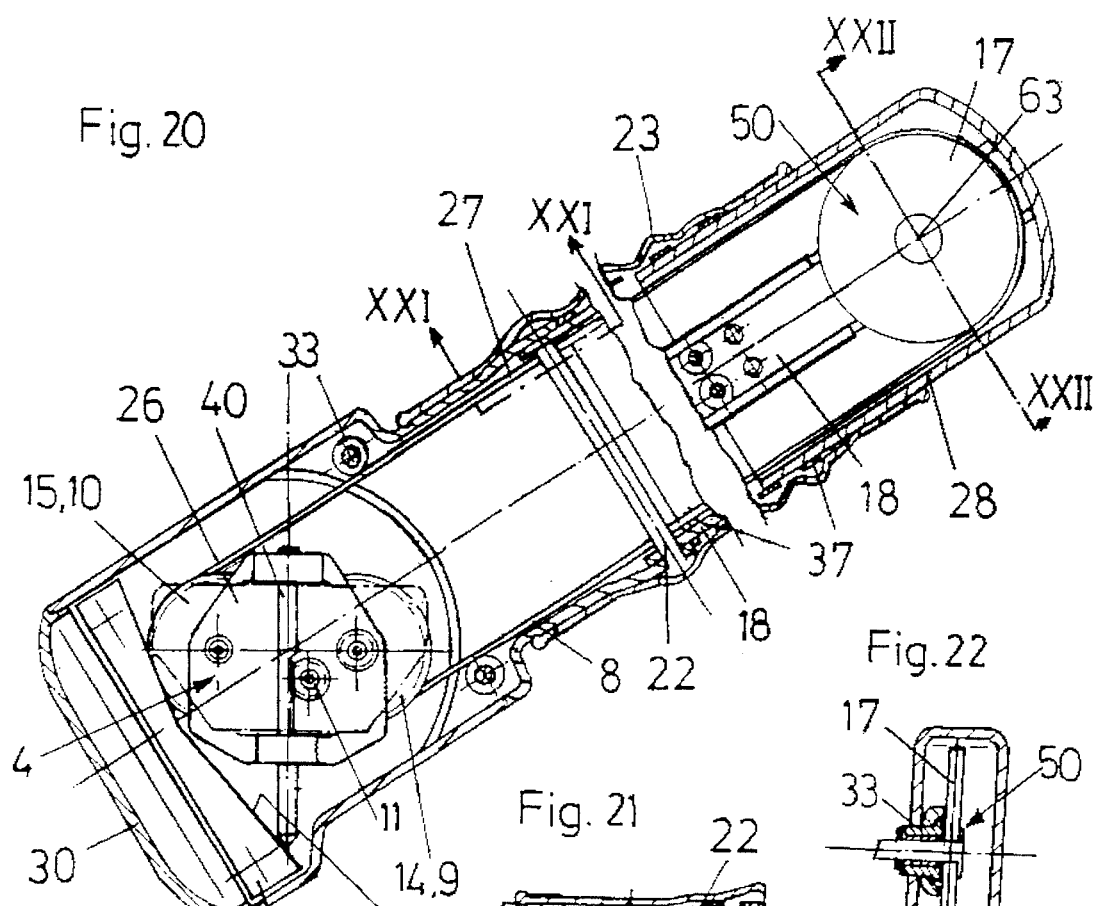
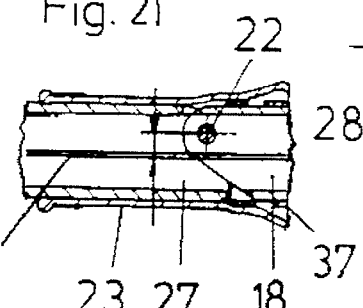
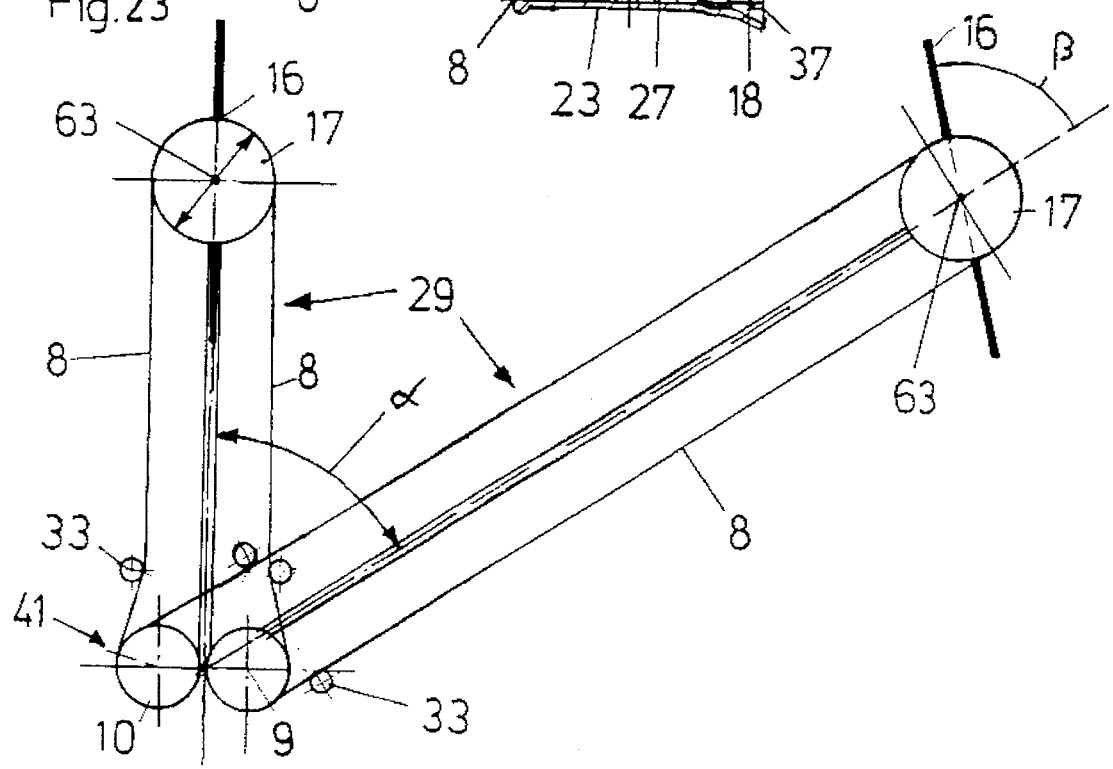

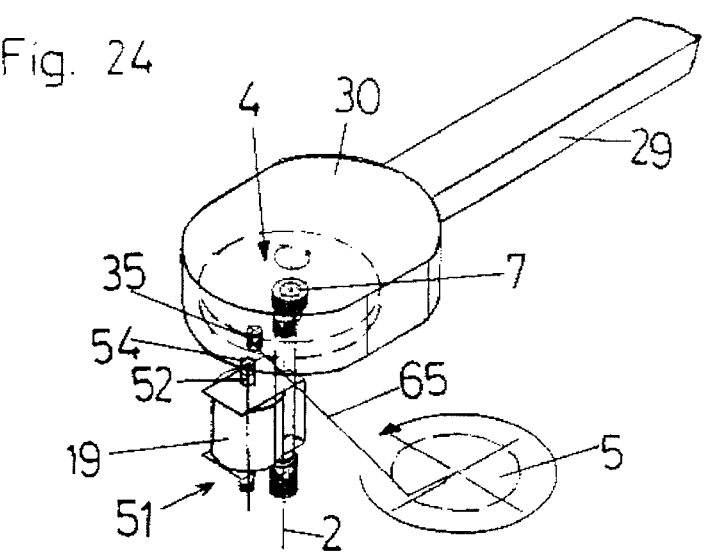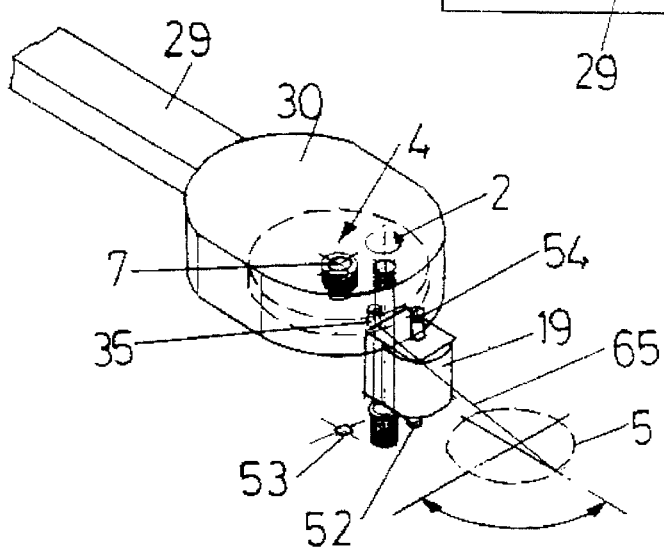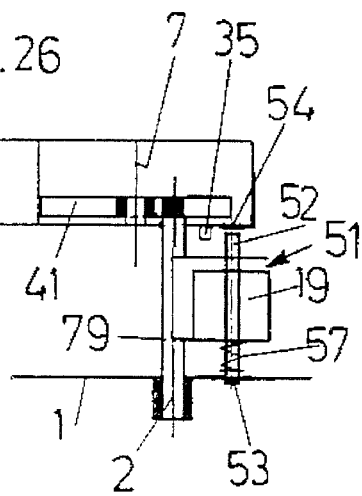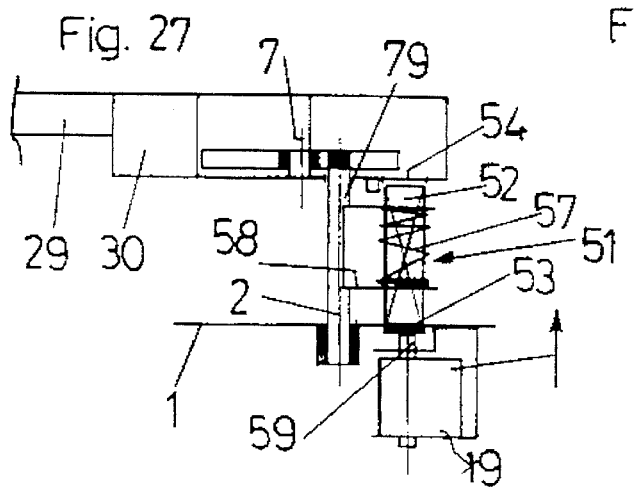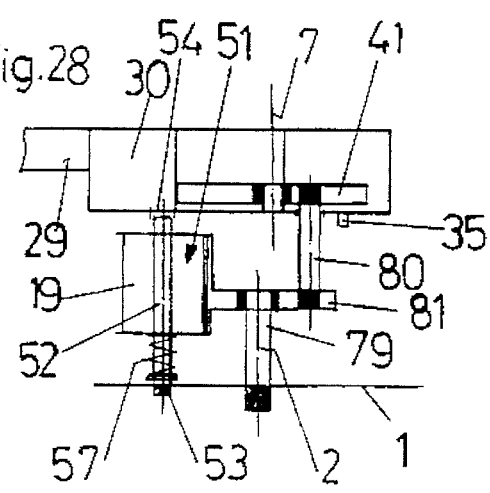

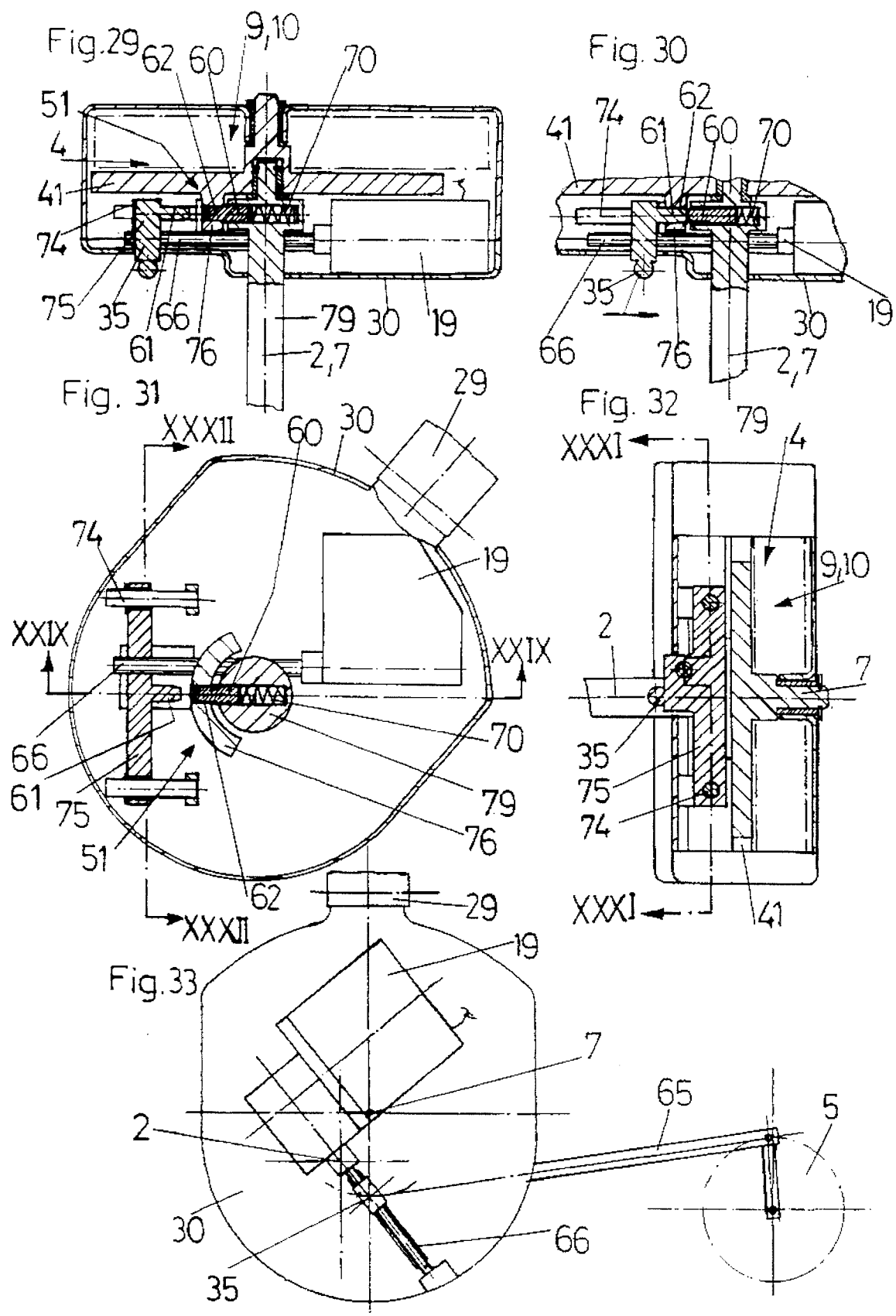

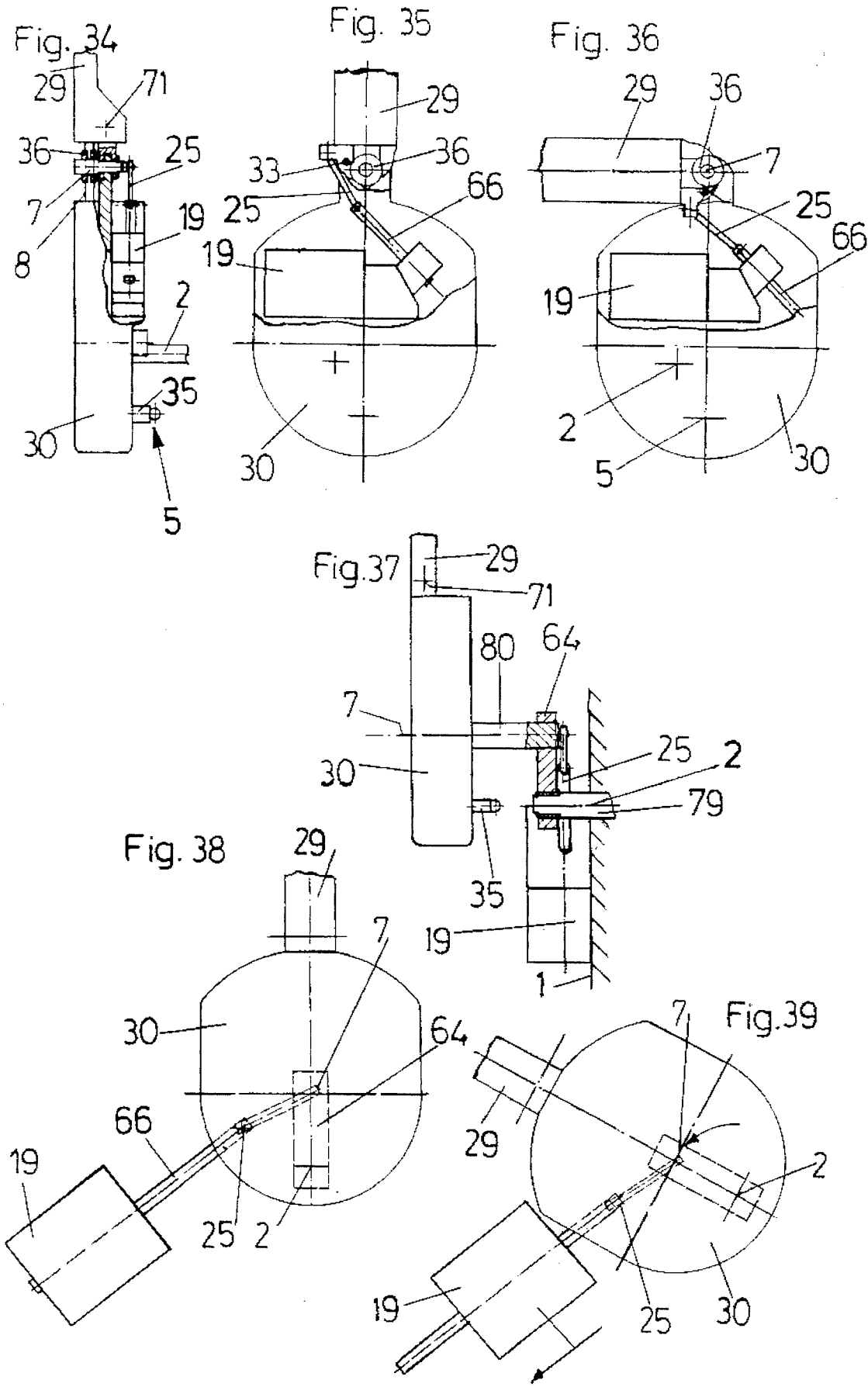

WINDSCREEN WIPER SYSTEM WITH BLADE CAPABLE OF MOVING IN A SWIVELLING AND PARALLEL MANNER RELATIVE TO THE WIPER ARM

This is a continuation of copending application(s) Ser. No. 08/032,417 filed on Mar. 15, 1993, abandoned, which is a continuation of Ser. No. 07/613,663 filed as PCT/AT90/00023, Mar. 28, 1990, published as WO90/11209, Oct. 4, 1990.

BACKGROUND OF THE INVENTION

The invention concerns a windscreen wiper system, particularly for passenger automobiles, with a wiper arm provided with a swivelling drive and which has on the free end part a pivot bearing for a wiper blade which can be guided essentially parallel over the windscreen, which blade lies approximately parallel to the wiper arm both in a position of rest in the region of the lower edge of the windscreen as well as also in a central working position, and with a control mechanism associated with the swivelling drive, which has a control element fastened to the vehicle for the parallel guiding of the wiper blade and a scanning element associated with the wiper arm that cooperates with the latter.

Such a windscreen wiper system is, for example, derived from U.S. Pat. No. 2,790,195. Its wiper arm contains two spring-loaded toothed racks, which together engage in a gear wheel on which the wiper blade is arranged, and which can be displaced at the free end of the wiper arm in a longitudinal slot. During wiper motion, the two toothed racks slide along two different control curves, each of which forms a flat V and are arranged on a control element fastened to the vehicle. Thus, the two toothed racks are shifted such that the wiper blade rotates and compensates for the wiper arm stroke by its motion in the longitudinal slot, so that it is guided approximately parallelly. The control curves continue vertically downward coupled to the V form, so that in the transfer to the rest position, the toothed racks are shifted such that the position of the wiper blade parallel to the lower edge of the windscreen is obtained.

Since such a windscreen wiper must move out over the wiper swivel region in the resting position, a parallel guiding over the entire width of the windscreen cannot be achieved. There thus remains either outwardly, or, in the case of two wiper arms, centrally, a region which is not swept over.

Wiper blade systems, in which the wiper blade, in the conventional manner, is maintained constantly approximately parallel to the swivelling wiper arm, which lengthens and then shortens again with increasing swivelling angle on both sides of the central position by means of a control mechanism in order to better sweep over the windscreen corner region, are known in various embodiments (U.S. Pat. No. A 4,447,928, German A 33 15 126, German A 34 11 160, EP A 218,192, EP A 236,757, German A 36 27 035, German A 34 35 475, German A 34 16 466, etc.). A parallel guiding of the wiper blade, however, is not given in any of these embodiments. The latter would, however, be favorable, since a swivelling wiper blade must swivel against the air flow applied to the vehicle and can thus lift off, particularly at high speeds.

Another parallelly guided wiper blade, for example, is known from German OS 36 41 551. The wiper blade there is coupled to two swivelling wiper arms, whose so-called effective lengths are varied during the swivelling motion, so that the wiper blade sweeps over an essentially rectangular field. In one embodiment, the length change of the wiper arm is thus effected by a crank mechanism, coupled to the swivelling drive, and this pushes the wiper arm in and out of a guide that swivels with it. In the rest position, the wiper blade lies laterally along the windscreen frame, whereby the wiper arm must extend obliquely outward over a lower edge of the windscreen. A transfer of the wiper arm together with the wiper blade to a rest position at the lower edge of the windscreen, or below the windscreen, however, is not possible.

German A 28 40 203 shows a windscreen wiper system, in which the swivelling wiper arm, to which the wiper blade is attached in a non-rotatable and approximately parallel manner, is positioned in a rotatable block eccentric to its axis of rotation. The wiper arm can be swung further from its outermost wiper position to a position of rest by means of an adjusting drive. This embodiment, however, has no possible means for parallel guiding.

SUMMARY OF THE INVENTION

The invention has now taken on the task of creating a windscreen wiper system, whose wiper blade can be guided parallelly over the entire windscreen, and can be swung approximately parallelly to the wiper arm with the latter at the lower edge of the windscreen.

This task is resolved according to the invention by providing a device for change-over between parallel and swivelling guide of the wiper blade, which has an adjusting drive putting the control mechanism out of action in the central working position and stopping the rotating drive of the wiper blade.

The windscreen wiper system thus contains a device for changing the type of operation, which can be actuated particularly for transfer to the rest position. By activating a switch, which can be coupled with the circuit breaker, the wiper arm is swung out by means of the adjusting drive from an approximately central working position, in which the wiper blade lies approximately flush with the wiper arm, so that a horizontal position corresponding to the rest position can be obtained along the lower edge of the windscreen. The stopping of the drive thus prevents the accidental rotation of the wiper blade due to changes in friction between the rubber of the wiper blade and the windshield. If the windscreen wiper requires it, then the wiper arm will be swung back again into an approximately central output working position by means of the adjusting drive, and the type of operation is changed over, whereby the control mechanism is again activated and the rotating drive is released. Thus a lengthening of the swivelling wiper arm is also preferably effected.

For placing the control mechanism out of operation and stopping the rotating drive of the wiper blade, several possibilities result, for example, the preventing of a relative motion between the control element and the scanning element, whereby either the control element is released from the arrangement fixed to the vehicle and swings with it, or the scanning element is held attached to the vehicle, but there is a change or a change-over of the control element, a change of the association of the scanning element, etc., which keeps the scanning element neutral each time, in spite of its relative motion to a control element.

Various possibilities also result with respect to the construction of the windscreen wiper system. Proceeding from the known embodiment with a swivelling drive attached to the vehicle, the adjusting drive may be arranged on the control element, on the bearing housing of the wiper arm, or even attached to the vehicle. If the adjusting drive is attached to the vehicle, the swivelling drive may be attached not only to the vehicle, but also may be associated with the control element or the bearing housing.

Preferred embodiments can provide that the control mechanism is arranged in a bearing housing of the wiper arm, and the swivelling drive engages on the bearing housing and/or that the control drive is arranged in a swivelable manner around a bearing axis fixed to the vehicle, whereby it is of advantage in both cases if the swivelling axis of the wiper arm is formed on the control element.

If a swivelling drive attached to the vehicle is utilized, a control mechanism which can swivel around the bearing axis is provided and forms the swivelling axis on the control element, thus preferably the adjusting drive loads a locking device, which transfers the arrangement of the control element attached to the vehicle in the central operating position to an arrangement attached to the wiper, Whereby the rotating drive of the wiper blade is stopped by the scanning element fixed with respect to the control element. In this case, a first embodiment provides that the adjusting drive is arranged on the control element and the locking device includes a locking pin which can be shifted in the control element parallel to the bearing axis, whereby a component attached to the vehicle and the bearing housing each have an opening for the selective engagement of the locking pin.

Alternatively, a second preferred embodiment consists of the fact that the adjusting drive is arranged on the bearing housing, and the locking device includes two locking pins which can be shifted perpendicularly to the bearing axis, the first of which is arranged spring-loaded in the bearing axis, and the second of which can be shifted in the bearing housing, whereby the control element has an opening into which the two locking pins can selectively engage. For example, a solenoid can be used as the adjusting drive in these two embodiments, and this loads the single locking pin or the two locking pins.

In the embodiment with two locking pins, the second locking pin may have a pivot shaft projecting from the bearing housing, to which the swivelling drive is coupled. Here an electrical motor, for example, having a drive worm can be used to advantage as the adjusting drive, so that the shifting length of the locking pin arranged in the bearing housing may be continuously adjusted, whereby a shifting of the engagement point of the swivelling drive may obtained. This leads to a change in the wiper angle, which is made smaller with increasing distance of the engagement point of the swivelling drive from the swivelling axis.

One-armwipers require a greater wiper speed as a consequence of the large overall swivelling angle in order to obtain the same wiper frequency when compared with pairs of windscreen wipers. The higher wiper blade speed may thus unfavorably affect the wiping quality, particularly at high vehicle speeds, so that visibility is adversely affected due to the formation of streaks, lifting off due to wiper rubber aquaplaning or the like. If a single-windscreen wiper system is arranged eccentrically in the driver's half of the windshield, then the wiper blade speed can be reduced in this half. Also, a central arrangement may lead to an asymmetry, if the engagement point of the swivelling drive is shifted obliquely to the longitudinal axis of the wiper arm. The slowed-down wiper blade then sweeps over the driver's side of the windshield in a fully flat manner, while on the passenger's side, an outer region is not covered. In the case of a two-arm windscreen wiper system, the engagement point of the swivelling drive of the wiper arm on the driver's side could be shifted outside only approximately, which results in a smaller wiping angle and a lower wiper blade speed, while on the passenger's side, a greater wiper angle and a greater speed occur, so that the windscreen is consequently cleaned in a completely flat manner. It is also conceivable to vary the crank length of the swivelling drive for the change in the wiping angle.

For the rest, the configuration of an adjusting drive for shifting the engagement point of the swivelling drive is not limited to a parallelly guided wiper blade, but could also be applied in the case of known windscreen wiper systems with co-swivelling wiper blade.

According to the previously described embodiments, the adjusting drive serves for change-over of the lock, whereby the swivelling drive swings the wiper arm into both types of operation.

If the control mechanism is arranged in the bearing housing with which the swivelling drive engages, or if the control mechanism can be swivelled around a bearing axis fixed to the vehicle, then the swivelling drive can be used only for swinging out the wiper arm during the parallel guiding of the wiper blade, and its swinging out, when the control mechanism is placed out of operation, will be taken over by the adjusting drive. For this case, another embodiment provides that a circuit component cutting out the swivelling drive in the central operating condition is associated with the adjusting drive, whereby the rotating drive is stopped by the resting swivelling drive. Thus if the swivelling axis of the wiper arm is configured on the control element, then it is preferably provided that the adjusting drive is arranged attached to the vehicle and the swivelling drive is provided on a carrying unit which can be swivelled by means of the adjusting drive, which unit is rigidly joined with the control element.

The swivelling axis and the bearing axis may thus lie coaxially. This is achieved, for example, by the fact that the swivelling axis is formed as a hollow shaft, through which is passed an axial bolt joining the carrying unit with the control unit, and this bolt is mounted in a swivelling manner in a bearing attached to the vehicle. On the other hand, if the swivelling axis and the bearing axis lie parallel to each other at some distance, then when the adjusting drive is actuated, there results a lateral displacement of the vehicle-fixed rotating point. This can be of advantage, as well as the eccentric arrangement, with particularly high windscreens, in which the wiper blade would project laterally beyond the windscreen with a wiper arm swung centrally into the rest position.

In addition, a parallel position of the bearing axis and the swivelling axis results when a swivelling drive attached to the vehicle is stopped in the central working position and likewise for a control mechanism which can swivel around the bearing axis, even if the adjusting drive is arranged attached to the vehicle, whereby the adjusting drive engages on the swivelling axis.

In another embodiment with the swivelling drive attached to the vehicle, which is stopped in the central working position, it is provided, if the swivelling axis is formed parallel to the wiper arm on the bearing housing, that the adjusting drive is arranged on the bearing housing which is swung out by means of the swivelling drive. Here, the wiper arm can be swung on its bearing housing when the control mechanism is kept attached to the vehicle, whereby, depending on the type of parallel guide, it is provided or it may be necessary that the adjusting drive and the swivelling drive are coupled in the sense of a compensating motion stopping the rotating drive after the swivelling drive has stopped. On the other hand, however, a central working position for stopping the adjusting drive may be selected, in which the wiper blade is twisted to the wiper arm to the extent of the twisting caused by the swivelling, so that the position at the lower edge of the windscreen is achieved without the coupling of the two drives.

Various possibilities are also given for the configuration of the control mechanism. Thus, a first embodiment provides that a spring-loaded control pin is mounted in a displaceable manner in the control element, and the scanning element is formed by a control curve formed in the bearing housing, and this curve is applied to the control pin. The fitting end of the control pin is thus preferably provided with a roller that reduces friction. The control pin is thus guided in the control element in its entire length, whereby the roller is arranged at a part standing away from the guide mechanism, and the scanning element partially covers the control element. The elements of the control mechanism, however, may also be interchanged. Since a change in the effective length of the wiper arm, i.e., a change in the distance between the pivot bearing and the swivelling bearing is necessary for the straight-line parallel guide of the wiper blade, another preferred embodiment is provided in that the wiper arm consists of at least two parts which can be shifted telescopically within one another, and two cable coils are mounted in rotating manner and running in opposite directions on the control element, whereby the parallel guide of the wiper blade comprises a cable control, which is joined on the one hand with a rotating disk bearing the wiper blade, and on the other hand is wound onto the cable coils such that it can be drawn out.

This embodiment thus contains essentially no place-robbing components, so that the mounting of the windscreen wiper system is possible in any passenger automobile. The place requirements for the windscreen wiper system according to the invention in no way exceed those for conventional, simple windscreen wipers.

A type of coupling of the bearing housing with the rotating disk carrying the wiper blade, which is similar to a rigid parallel guide, is provided by means of the two segments of the cable control, whereby the ends of the cable control wound onto the cable coils assure the adaptation of the cable length made necessary by the length change of the wiper arm.

Thus in a preferred embodiment, it is further provided that the control pin is provided with a gearing, which engages in a drive rotating in a direction opposite to the cable coil.

In this way, the adaptation of the cable length is made independently of any swivelling angle of the wiper arm. For this purpose, it is conceivable in one embodiment that the control pin has a longitudinal slot, which is provided with two toothed bands, whereby in each toothed strip a pinion is engaged driving a cable coil. A preferred embodiment thus results if the cable coils are arranged coaxially over one another, and the two toothed strips are arranged at different heights in the longitudinal slot, whereby one pinion is joined with the first cable coil by means of a hollow shaft, in which the shaft of the second cable coil is arranged. Instead of two toothed strips, also only one may be provided, whereby the opposite rotational motion of the other cable coil is produced by a transfer element arranged between the two cable coils.

The control pin could also be provided between the two cable coils, and in another variant, it is conceivable that the two cable coils are arranged with peripheral gearing next to one another in the control element. Instead of the gearing and the toothed wheels engaged in the latter, a cable control could also be used for transfer of movement between the control pin and the cable coils.

It is further provided preferably for the restoration of the drawn-out cable control that a spiral spring is associated with the cable coils. The spiral spring is thus arranged between the two cable coils lying over one another, which have in each case a lateral recess. However, a spiral spring could be associated with each cable coil, and this spring would be supported, for example, on the bearing housing.

In order to achieve the placement of the wiper blade over the entire height, in the case of windshields that are very curved with respect to their height, it can further be provided that the parts arranged telescopically are bent in the longitudinal direction.

A further preferred embodiment, which achieves the shortening of the pushed-out wiper arm, provides that the telescopically arranged parts of the wiper arm are retractable against the force of a helical spring. The helical spring thus loads the wiper arm continuously in the sense of a lengthening, which is estimated by the cable lengths that are uncoiled, if the control pin follows the control curve when the wiper arm is swung out, and thus the cable coils are driven such that the cable is released. The helical spring thus also indirectly loads the control pin. In the swivelling back, an opposite course of motion results. The control curve shifts the control pin, which drives the cable coils in a counter-direction over its gearing so that the two coils are retracted, whereby the wiper arm is compressed against the helical spring. If a spiral spring is associated with the cable coils, then a slightly larger spring force is selected for the counteracting helical spring. In this way, in the position of rest, both the control pin as well as the pinion engaged in its gearing are nearly unloaded, and thus load peaks are avoided in the operating state. The described parallel guide by means of a cable control represents, however, only one possible embodiment. Instead of one cable control and two cable coils rotating in opposite direction, other drive forms would also be conceivable, for example, a spherical toothed unrolling element, which combines a spherical toothed rotating disk of the wiper blade with a spherical toothed shaft which can be changed in length, whereby a spring also is used.

In a preferred embodiment, it is further provided that the helical spring attaches to the part connected to the bearing housing and to the end part of the wiper arm bearing the rotating disk, and is surrounded by a communicating bellows. The wiper arm or all movable parts are protected on the outside by the communicating bellows, and a responsive appearance is obtained, whereby a lubrication of all moving parts in the wiper arm can be obtained, if the communicating bellows is filled with a lubricating agent, for example, grease. Instead of by means of a spring, the telescopically shiftable parts could also by moved by means of another cable control or by means of a gearing.

If the two cable coils lie coaxially, then they may have a relatively large diameter, whereby an additional gearing down remains between the control pin and the control coil. In order to obtain an exact parallel guide, the rotating disk must have the same large diameter for the wiper blade. Since the pivot bearing of the wiper arm and the wiper blade holder must be kept as narrow as possible, it is provided in another embodiment that the rotating disk of the wiper blade have a gearing in which a drive worm driven by the cable control is engaged, the stopping of which blocks the twisting of the wiper blade. Here the gearing down is achieved by the use of a worm for the drive of the rotating disk, so that the cable coils can have the desired larger diameter. Instead of the drive worm, other suitable gearing down drives could also be provided. The drive worm may be associated with a cable disk, by means of which the cable control is guided, whereby a positive locking may also be formed between the cable and the cable disk, for example, by thickenings of the cable and recesses of the cable disk. Preferably, an embodiment is selected in which the drive worm is joined with a cable drum, on which the cables of the cable control are coiled in opposite directions.

Since windshields, particularly in passenger automobiles, are not rectangular, but are often in the shape of a trapezium, an exact parallel guide of the wiper blade does not encompass a fully flat covering of the windscreen from side edge to side edge or within the desired wiping region. By means of different diameters or selectable gear-downs between the drive worm and the rotating disk, an adapted trapezium-shaped wiping surface can be obtained, whereby the wiper blade twists around a rotating angle that is larger than the swivelling angle, with respect to the wiper arm. By a corresponding configuration of the control curve, the wiping surface may also be adapted to a bent longitudinal edge of the windshield.

For pressing the wiper blade against the windshield, another preferred embodiment provides that the wiper arm is mounted in a swivelling manner around a cross axis on the bearing housing and is loaded by a helical spring pressing the wiper blade against the windshield, which spring is engaged on the one hand on the wiper arm, and on the other hand, on the control element eccentric to the swivelling axis. The eccentric attachment of the compression spring on the control element has the advantage that the compression force is increased with increasing swivelling angle, since the spring tension changes due to the lengthening of the spring.

In the preferred embodiment with cable control and helical spring, however, the helical spring of the wiper arm may be used also for pressing the wiper blade, if a cross axis is provided in the part of the wiper arm connecting to the bearing housing, on the side of the cable control turned away from the wiper blade, onto which the remaining part of the wiper arm is mounted in a swivelling manner. In this way, the cable control held by the spring under tension lies closer to the windshield than the cross axis, so that a loading of the wiper arm and thus of the wiper blade to the windshield is produced. In particular, in such an embodiment, it may be further provided that a strap is provided for mounting onto the vehicle in the region of the lower edge of the windshield, onto which the wiper arm arrives when the base unit is swung into the rest position, whereby the wiper blade lifts off the windshield. In this way, in the rest position, the placement of the wiper blade on the windshield is prevented, so that it does not freeze to it in the winter, and in the summer, adhesion is not produced due to the effects of dirt and sun.

In the following, the invention is now described in more detail on the basis of the figures in the attached drawing, without being limited to these.

BRIEF DESCRIPTION OF THE DRAWINGS

FIGS. 1–7 show top views onto windscreens of vehicles with windscreen wiper systems of the invention, in which the wiper arm is shown in several positions;

FIGS. 8–15 show details of a first embodiment of a windscreen wiper system, whereby FIG. 8 shows a longitudinal section along line VIII—VIII of FIG. 9; FIG. 9 shows a partially cutaway top view; FIG. 10 enlarges the bearing region of the wiper arm in longitudinal section along line X—X of FIG. 12; FIG. 11 shows a section along line XI—XI of FIG. 12; FIG. 12 enlarges the bearing region of the wiper arm in the section according to FIG. 9; FIG. 13 shows a section along line XIII—XIII of FIG. 8; FIG. 14 shows a section along line XIV—XIV of FIG. 9; and FIG. 15 shows a section along line XV—XV of FIG. 10;

FIGS. 16–23 show details of a second embodiment of a windscreen wiper system, whereby FIG. 16 shows an enlarged section along line XVI–XVI of FIG. 17; FIG. 17 shows a schematic horizontal section; FIG. 18 shows a section along line XVIII—XVIII of FIG. 16; FIG. 19 shows a section along line XIX—XIX of FIG. 16 in the central operating position of the wiper arm; FIG. 20 shows the same section in a lateral reversed position of the wiper arm; FIGS. 21 and 22 show sections along lines XXI—XXI and XXII—XXII in FIG. 20; and FIG. 23 shows a schematic representation of the wiper arm and wiper blade in the central operating position and a lateral reversed position;

FIGS. 24–26 show schematically a device for change-over between parallel and swivelling guide of the wiper blade, whereby FIG. 24 shows the arrangement attached to the vehicle and FIG. 25 shows the arrangement of the control drive attached to the wiper arm; and FIG. 26 shows a side view of the arrangement according to FIG. 24; FIG. 27 shows a lateral view according to FIG. 26 of a second embodiment of the change-over device;

FIG. 28 shows a lateral view according to FIG. 26 of a third embodiment of the change-over device;

FIGS. 29–32 show details of a fourth embodiment of the change-over device, whereby FIG. 29 shows a section through the bearing housing along line XXIX–XXIX of FIG. 31 in the arrangement attached to the vehicle, and FIG. 30 shows the same section in the arrangement attached to the wiper arm; FIG. 31 shows a section along line XXXI—XXXI of FIG. 32; and FIG. 32 shows a section along line XXXII—XXXII of FIG. 31;

FIG. 33 shows a schematic top view of another embodiment of the change-over device of FIGS. 29–32 with a displaceable engagement point of the swivelling drive;

FIGS. 34–36 show a schematic representation of another embodiment, whereby FIG. 34 shows a partially cutaway view; and FIGS. 35 and 36 show schematic top views in two wiper arm positions; and FIGS. 37–39 show the schematic representations of another embodiment corresponding to FIGS. 34–36.

DETAILED DESCRIPTION OF THE PREFERRED EMBODIMENT

Figure 4:
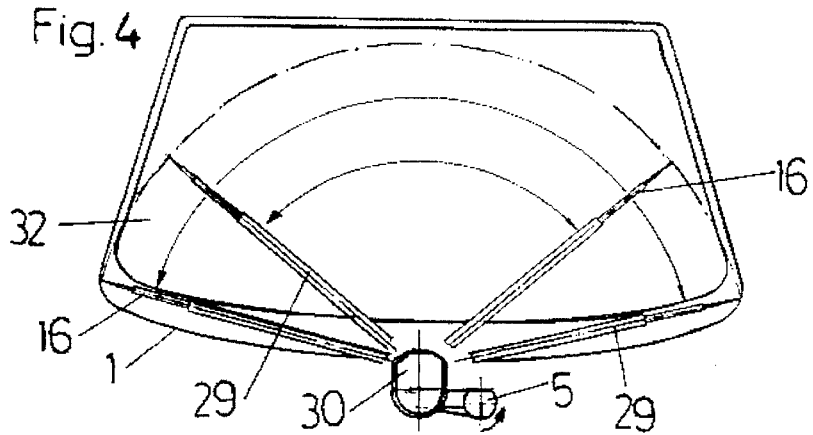

A vehicle 1 has an approximately trapezium-shaped, curved, and if necessary, laterally thicker, bent-back windshield 32, which is associated with a single-arm windscreen wiper system. This is provided with a wiper arm 29 having a bearing housing 30 which is adjustable in length, which arm is indicated in FIGS. 1–7 in various positions during the course of movement controlled by swivelling drive or wiping drive 5. A wiper blade 16 is mounted in a rotating manner on wiper arm 29. The windscreen wiper system is arranged on automobile 1 below windshield 32.

FIG. 1 shows a central arrangement of the windscreen wiper system, whereby the wiper arm 29 extends over the height of windscreen 32 in the central operating position, in which it has its shortest length, and in which the approximately parallelly guided wiper blade 16 is flush with wiper arm 29. When wiper arm 29 is swung out, wiper blade 16 sweeps over the surface that is bordered by the broken line, whereby, however, there occurs a slight inclination of wiper blade 16, so that in the end position it extends along the edges of the windshield. Wiper arm 29 can be transferred from the central working position to at least one position of rest, which is depicted in FIGS. 4–7, and in which wiper blade 16 lies along the lower edge of the windshield without twisting and opposite wiper arm 29. A swivelling drive 5 is also arranged attached to the vehicle.

According to FIG. 2, an eccentric arrangement of the windscreen wiper system serves for the purpose of obtaining the rest position in the case of a windshield 32 with a greater height, without wiper blade 16 jutting out laterally. The fully flush sweeping over windshield 32 is obtained by different lengthenings of the wiper arm in the two edge positions, whereby the rest position which can be obtained by means of an adjusting drive 19 is given on the driver side. In this way, when the windshield wiper is turned on, the driver's side of the windshield is swept over by the high swivel in the central operating position.

FIG. 3 again shows a central arrangement, in which the two symmetrical edge positions of the normal operation and the two asymmetrical edge positions of an operation for a high vehicle speed and with a heavy rain are indicated, in which the wiping field is made smaller by displacing the engagement point of swivelling drive 5.

FIG. 4 shows the windscreen wiper system according to FIG. 1, whereby the windscreen wiper system is shown as a conventional windshield wiper with a wiper blade guided in a swivelling manner. Here also, edge positions of two wiping fields of different magnitude arising as a result of the displacement of the engagement point of the swivelling drive are shown. The edge positions of the larger wiping field are thus simultaneously also rest positions.

Figure 5:
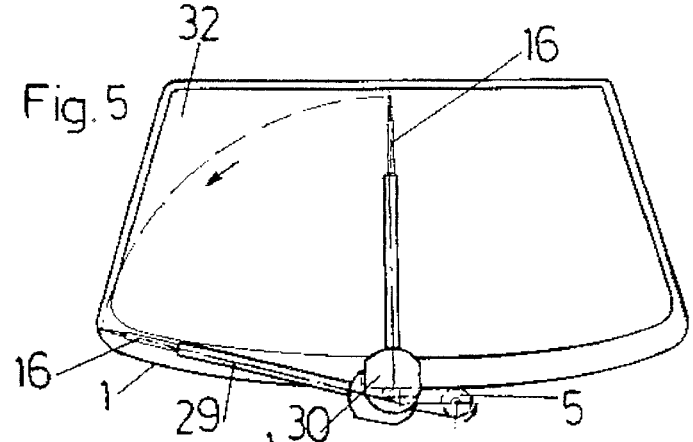
Figure 6:
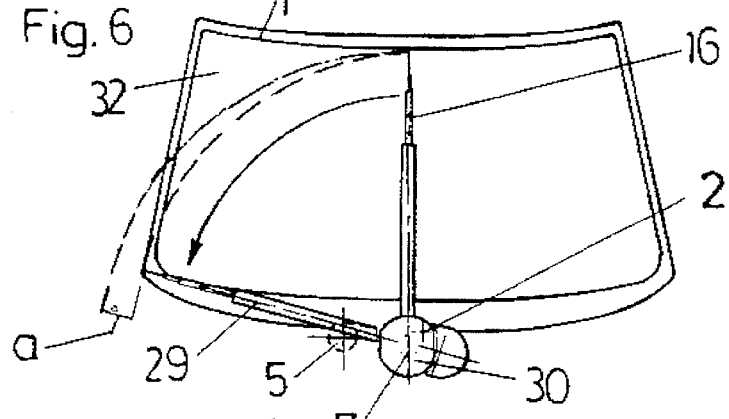

FIGS. 5 and 6 show central arrangements, which are swung around an eccentric bearing axis 2, so that in windshield 32 of greater height, wiper blade 16 does not jut out laterally in the rest position, whereby FIG. 5 shows a smaller lateral displacement, and for vehicles with a free space that is limited on the bottom for the rotating bearing housing 30. FIG. 6 requires a larger lower and lateral free space for bearing housing 30, but leads to an extreme displacement of wiper blade 16 by distance a. Here, a maximum distance is given between bearing axis 2 and swivelling axis 7.

Figure 7:
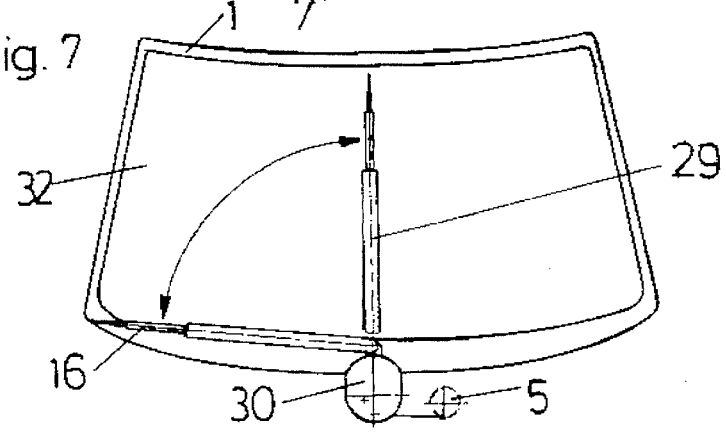

FIG. 7 shows another variant, in which wiper arm 29 can be swung around on bearing housing 30 for transfer to the rest position, whereby also a shortening of the lateral extension is produced.

Construction details of two examples of embodiment of the windshield wiper according to the invention are shown in FIGS. 8–23. In the first embodiment according to FIGS. 8–15, which is arranged on vehicle 1, for example, according to FIG. 1, bearing housing 30 is arranged in a swivelling manner around bearing axis 2 attached to the vehicle and has a pivot shaft or drive pin 35, on which a guide rod 65 (FIG. 24) of the swivelling drive 5 also attached to the vehicle is engaged. Bearing axis 2 passes through a circular-shaped slot 56 and has a plate-shaped control element 41 of a control mechanism 4 also attached to the vehicle. A control pin 40 is arranged spring loaded and displaceable in control element 41 in a longitudinal slot 77, and this pin cooperates with a control curve 42 of a scanning element 6 of control mechanism 4, which element is formed in bearing housing 30, whereby the placement part on control curve 42 is formed by a roller 39. Control pin 40 has a longitudinal slot 43, on which is provided on both longitudinal sides at various levels, two toothed strips 44 and 45. The swivelling axis 7 attached in the bearing housing passes through control element 41 and longitudinal slot 43 of control pin 40 and has a pinion 47, which engages in toothed strip 45, as well as a cable coil 10. Further, a hollow shaft 48 is mounted on swivelling axis 7, which shaft has a pinion 46 engaging in toothed strip 44, and is joined with a cable coil 9. If control pin 40 is shifted over control curve 42 by twisting of bearing housing 30 (FIG. 12), then the two coaxially arranged cable coils 9, 10 will rotate in opposite directions by means of the two pinions 46, 47, each of which engages in a toothed strip 44, 45. The two cables of a cable control 8 are wound or unwound therefore from cable coils 9, 10. A spiral spring 38 (FIG. 11) is supported on the two cable coils 9, 10, and this spring is arranged in recesses of cable coils 9, 10 directed toward each other, and loads cable control 8 in the winding up direction. Cable control 8 runs over two deflecting rollers 36 arranged in bearing housing 30, so that the two cables run at a slight distance in wiper arm 29. Wiper arm 29 consists of at least two parts 27, 28, of which part 27 is joined to scanning element 6 formed in bearing housing 30 by means of a cross axis 71, and is braced with control element 41 by means of a helical spring 72 arranged on the side of the wiper blade, so that wiper arm 29 is pressed against windshield 32. As can be seen from FIG. 15, helical spring 72 engages on a pin 73 of control element 41, which is arranged eccentrically to swivelling axis 7, so that the swinging of wiper arm 29 increases the spring tension and thus the compression pressure of wiper blade 16.

Parts 27 and 28 of wiper arm 29 are telescopically displaceable, if necessary, in profiles that are curved in the longitudinal direction, which may contain, if necessary, a central part 18, and between which, one or more roller bearing cages 55 are arranged. The end part 28 of wiper arm 29 has a pivot bearing 63 for the rotating drive 50 of wiper blade 16. A rotating disk 17 bearing wiper blade 16 is mounted in pivot bearing 63, and this disk has a peripheral gearing 67. The latter engages with a drive worm 68, in which two cable drums 69 are arranged, on which the two cables of cable control 8 are attached wound up in opposite directions. A helical spring 37 which pushes out the two parts 27, 28 is provided in wiper arm 29 for the spring loading of control pin 40. This spring operates against spiral spring 38 by means of the cables of cable control 8 attached onto cable drums 69, cable coils 9, 10, and pinions 46, 47 joined to the latter on control pin 40, which is compressed against control curve 42. When bearing housing 30 is swung out, the shifting of control pin 40 thus causes a change in length of wiper arm 29 outwardly loaded due to helical spring 37 with a simultaneous and equal change in length of both cables of cable control 8, whereby the cables which are essentially guided in a parallel manner form rotating drive 50 of wiper blade 16. The selection of the gearing down between rotating disk 17 and drive worm 68, of the diameter of cable coils 9, 10, and of the diameter of pinions 45, 46, or the width of longitudinal slot 43 determine the rotating angle of wiper blade 16 as a function of the swivelling angle of wiper arm 29, whereby an adaptation to any form of windshield 32 or the desired wiping field is possible without problem. Wiper arm 29 is surrounded by a protecting communicating bellows 23, filled with lubricant if necessary.

In the second embodiment according to FIGS. 16–23, which is arranged in the automobile, for example, according to FIG. 2, the bearing housing 30, as shown in FIG. 16, is mounted in a swivelling manner in a mounting strap 34 attached to the vehicle and defining a bearing axis 2. The mounting strap 34 supports an axial bolt 20, on which a carrying unit 21 is attached in a manner preventing rotation by means of a cotter pin 78. Carrying unit 21 is joined with an adjusting drive 19 (FIGS. 2, 17) by means of a guide rod 25, and this adjusting drive swings carrying unit 21 around bearing axis 2 between the positions depicted in FIG. 2 by the dashed lines. The swivelling drive 5 is arranged on carrying unit 21, and the secondary drive of this drive is formed by a hollow shaft 3, which is mounted in rotating manner on axial bolt 20. If adjusting drive 19 comes to a stop, then swivelling drive 5 is maintained attached to the vehicle.

Hollow shaft 3 and axial bolt 20 project through the car body of automobile 1 to the outside (FIG. 17), whereby the bearing housing 30 is attached rigid to rotation on hollow shaft 3, in which housing the axial bolt 20 terminates and control mechanism 4 is arranged. A bearing part 26 is attached onto axial bolt 20, in which part the two cable coils 9, 10 are mounted in rotating manner and are provided with engaging front toothed wheels 14, 15. A toothed wheel 13 of a drive 11 is provided on the shaft of cable coil 9 and of front toothed wheel 14, and this wheel 13 has a pinion 12, which engages in control pin 40 which has a gearing. Control pin 40 is arranged in a displaceable manner on bearing part 26 and is applied against control curve 42 of scanning element 6 formed in bearing housing 30. When the adjusting drive is stopped, bearing part 26 together with control pin 40, cable coils 9, 10, and drive 11 thus form control element 41 of control mechanism 4, which is attached to the vehicle, for wiper arm 29 which contains scanning element 6 and control curve 42. The ends of cable control 8 are again wound onto the two cable coils 9, 10, and this cable control is joined with the rotating disk 17 mounted in pivot bearing 63, and may consist of one continuous or two individual cables. Cable control 8 may be attached to rotating disk 17, or it may also form a locking piece, if thickenings of cable control 8 engage in recesses of rotating disk 17. The twisting of wiper blade 16 relative to wiper arm 29 proceeds in a parallel manner, if the diameter of rotating disk 17 corresponds to the diameter of control element 41. As can be seen from FIG. 23, the total diameter of control element 41 is somewhat larger than the diameter of rotating disk 17, whereby cable control 8 is guided over rollers 33, so that the rotating angle β of rotating disk 17 is somewhat greater than the swivelling angle α from the central position. This leads to a deviation of wiper blade 16 from its parallel position to the width (height) of windshield 32 and thus to a trapezium-shaped wiping surface. An adaptation to different windscreens 32 may thus be very easily produced by utilizing rotating disks 17 with different diameters. According to FIGS. 19 and 23, wiper arm 29 has its smallest length in a central working position and a wiper blade 16 extending approximately parallel to this. Now if swivelling drive 5 comes to a stop, which arrests rotating drive 50 of wiper blade 16 and actuates adjusting drive 19, then wiper arm 29 including swivelling drive 5 may be swung away from this approximately central position to a rest position on the driver's side around bearing axis 2 coaxial with swivelling axis 7, without change in length, whereby it lies parallel to the lower edge of the windshield, and if necessary, is placed in a recess on the automobile.

As can be seen from FIGS. 20 and 22, in this embodiment, the part 27 of wiper arm 29 which connects to bearing housing 30 has a cross axis 22, which lies outside the central longitudinal plane, so that wiper blade 16 is compressed against windscreen 32 by the cable control 8 tensed by helical spring 37. As depicted in FIG. 2, wiper arm 29 may lie in the rest position on a strap 24 or the like provided with an oblique take-up surface, so that wiper blade 16 is protected.

If the windscreen wiper system is switched on, carrying unit 21 swings out first from the rest position to the operating position by means of adjusting drive 19, whereby the part of the windshield 32 on the driver's side corresponding to a conventional wiper system is swept over in an arc, and then adjusting drive 19 is disconnected and swivelling drive 5 is turned on. By an appropriate selection of the asymmetrical arrangement under windshield 32 shown in FIG. 2, wiper arm 29 may be transferred to the rest position independently of the length-width (height) ratio of windshield 32, and simultaneously, a lower wiper blade speed will be obtained on the driver's side as well as on the passenger's side. Adjusting drive 19 may comprise, for example, a servo piston actuated by an engine underpressure, an electrical motor, an electromagnet, etc.

A suitable device for change-over between a parallel and swivelling guide is shown schematically in FIGS. 24–26 for the windscreen wiper system shown in FIGS. 1 and 3 with a swivelling drive 5 attached to the vehicle; this device may be ascribed, for example, to the embodiment explained in more detail in FIGS. 8–15. Control element 41 of control mechanism 4 is attached to a bolt 79 defining the bearing axis 2, which bolt is arranged in rotating manner in a bearing attached to the vehicle. The adjusting drive 19 is attached to this bolt 79, and this drive is designed, for example, as a solenoid and actuates a locking device 51 (FIG. 26) which has a single locking pin 52 in this embodiment. Locking pin 52 may be displaced parallel to bolt 79 and is loaded by a spring 57 to automobile 1. FIG. 24 shows the lock of control element 41 attached to the vehicle in which the lower end of locking pin 52 is pressed by spring 57 into an opening 53 of vehicle 1, so that bearing housing 30 is swung around swivelling axis 7. When adjusting drive 19 is actuated, locking pin 52 is loosened from opening 53 and shifted into opening 54 in bearing housing 30 (FIG. 25), so that a locking attached to the wiper is given. Swivelling drive 5 now also moves with bearing housing 30 the complete control mechanism 4, which thus is switched off around bearing axis 2, whereby wiper blade 14 swivels in a circular arc (FIGS. 4–6).

FIG. 27 shows a variant in which a holder 58 is arranged on bolt 79 for locking pin 52, which again can be moved between alternating engagements in openings 53 and 54 by means of adjusting drive 19. Adjusting drive 19 is thus arranged attached to the vehicle and has a bar 59 pushing locking pin 52 out from vehicle opening 53, whereby opening 53 remains filled by bar 59 until adjusting drive 19 comes to a stop.

FIG. 28 shows a variant, which functionally corresponds to the embodiment according to FIG. 26. Adjusting drive 19 is arranged on a cross element 81 which can swivel on bolt 79, and locking pin 52 again engages selectively in opening 53 of automobile 1 or opening 54 of longitudinal housing 1. A joining pin 80 extends from cross element 81 to control element 41, which is thus also attached to the vehicle in the depicted position. If adjusting drive 19 is actuated, locking pin 52 locks cross element 81 with bearing housing 30, so that the latter including the control drive can swing around bearing axis 2. According to this embodiment, various distances between bearing axis 2 and swivelling axis 7 can be produced in a simple way by selection of cross pieces, so that an adaptation to different windshield shapes, for example according to FIGS. 4–6 is very simple.

Another embodiment of a change-over device in the case of swivelling drive 5 attached to the vehicle is shown in FIGS. 29–32, whereby the changing device is constructed within bearing housing 30. In this embodiment, control element 41 of control mechanism 4 is arranged in a rotating manner around bearing axis 2, which simultaneously represents swivelling axis 7, whereby bolt 79 defining bearing axis 2 has a radial borehole, in which a first locking pin 60 is loaded in a displaceable manner by a spring 70. Control element 41 has a projection 76, in which an opening 62 is formed, in which locking pin 60 is pressed by spring 70 (FIG. 29). In this position, control element 41 is held attached to the vehicle, so that by swinging bearing housing 30 by means of the swivelling drive engaging on pivot bolt 35, control mechanism 4 is made effective for changing the wiper arm length and the twisting of wiper blade 16. Adjusting drive 19 is arranged on bearing housing 30, and in this embodiment is formed particularly by an electrical motor with a threaded spindle 66, which passes through a slot 75, which is displaceable in a guide 74. Pivot bolt 35 for engaging swivelling drive 5 and a second locking pin 61 are provided on slot 75, which together with the first locking pin 60 belongs to locking device 51. If adjusting drive 19 is actuated such that slot 75 moves in the direction of the arrow shown in FIG. 30, then in the central working position, the second locking pin 61 inserts into opening 62 of projection 76 of control element 41 and displaces the first locking pin 60. In this way control element 41 is locked attached to the wiper arm (FIG. 30) and the control mechanism is placed out of action. Thus since the engagement point of the swivel arm is convergent with bearing axis 2, the swivelling angle is enlarged, so that wiper arm 29 lies deeper in the rest position than during the wiping motion and the wiper speed is accelerated. Slot 75 may be removed also from bearing axis 3, by means of adjusting drive 19, from the parallel guide position of wiper blade 16 according to FIG. 29, whereby there results a reduction in the wiper speed and a decrease in the wiper field (FIGS. 3, 4). This can be of particular importance for high vehicle speeds in order to assure an unobjectionable functioning of the windscreen wiper system. FIG. 33 shows a variant of a bearing housing 30, in which swivelling axis 7 and bearing axis 2 are not arranged coaxially, but at some distance from each other, whereby threaded spindle 66 runs at an angle of approximately 45° to the plane of symmetry of wiper arm 29, as in the embodiment according to FIGS. 29–32. The displacement of pivot bolt 35 again changes the position of guide rod 65 of swivelling drive 5 and the size of the swivelling angle of wiper arm 29. It is particularly seen from FIG. 33 that the displacement of pivot bolt 35 also brings about a shifting in the central working position, so that the latter produces an asymmetrical wiper field according to FIG. 3 despite the central arrangement of the windscreen wiper system. A reduction in the wiping angle by increasing the distance between swivelling axis 7 and the engagement point of swivelling drive 5 on bearing housing 30 can thus not touch only a minimum edge strip on the driver's side according to FIG. 3, whereas the uncontacted edge strip is essentially greater on the passenger's side. This position may be important, as has been mentioned, with a high vehicle speed and a heavy rain, whereby the passenger's view is of lesser importance.

A bearing housing 30 is shown in FIGS. 34–36, whereby the change-over device has an adjusting drive 19 arranged on bearing housing 30, and swivelling drive 5 is again made fixed to the vehicle. In this embodiment, control mechanism 4 is attached to the vehicle for each type of guide for wiper blade 16, whereby swivelling axis 7 is arranged on bearing housing 30 for swivelling into the rest position (FIG. 7), so that wiper arm 29 thus can be swung by means of adjusting drive 19 and threaded spindle 66, relative to bearing housing 30, if swivelling drive 5 is stopped. Guide rod 25 of adjusting drive 29, which advantageously is an electrical motor, engages on a lateral projection of wiper arm 29, on which a deflecting shaft 33 is provided, if a cable control 8 is used. A differential change in length of the two cables of cable control 8, which cannot avoid swivelling axis 7, rotates wiper blade 16 in pivot bearing 63. In order to obtain the desired approximately parallel position of wiper blade 16 to wiper arm 69 in the rest position, however, there are two possibilities. First, swivelling drive 5 may be switched on in the case of actuation of adjusting drive 19 to an extent which equilibrates the undesired twisting of wiper blade 16. Secondly, a central working position may be selected as the output position for transfer to the rest position, in which wiper blade 16 is twisted around the rotating angle effected by the swinging opposite wiper arm 29.

FIGS. 37–39 show another embodiment of the change-over device. Both adjusting drive 19 as well as swivelling drive 5 are arranged attached to the vehicle, whereby again an electrical motor with a threaded spindle 66 is used as adjusting drive 19. A carrier plate 64 is mounted in a rotating manner on bolt 79 defining bearing axis 2, and on this plate is attached a part forming swivelling axis 7 and joined to control element 41. The pivot shaft 35 of swivelling drive 5 lies at the same distance between swivelling axis 7 as bearing axis 2, so that the latter is flush in the central working position (FIG. 38). Guide rod 25 of adjusting drive 19 engages on swivelling axis 7 below carrier plate 64, whereby when swivelling drive 5 is stopped, transfer to the rest position (FIG. 39) is produced by actuating adjusting drive 19.

What is claimed is:

1. A wiper system for a windscreen, particularly for passenger vehicles, said windscreen having upper and lower edges and two side edges, said system comprising:

means for supporting the wiper system on the vehicle, said means for supporting including a bearing shaft which defines a bearing axis, a control element mounted on said bearing shaft, and a swivelling shaft mounted on said control element, said swivelling shaft defines a swivelling axis, said bearing shaft and said swivelling shaft being parallel to and spaced apart from each other;

an elongated wiper arm having opposite ends, said wiper arm including a bearing housing at one end and a free end part having a blade pivot bearing at the other end, said bearing housing being connected to said swivelling shaft so that said control element is pivotable relative to said bearing housing, said system has two modes of operation wherein in a first mode the arm is pivotable about the bearing axis and in a second mode the arm is pivotable about the swivelling axis, said wiper arm being capable of being swivelled in said second mode about said swivelling axis through a central working position, said wiper arm also being capable of being pivoted in said first mode about said bearing axis from said central working position into a rest position in a region of said lower edge of the windscreen;

an elongated wiper blade coupled with a rotating drive, said drive being mounted in the blade pivot bearing, said rotating drive being connected to a means for controlling the rotating drive, said means for controlling the rotating drive being mounted in said bearing housing, said wiper blade remaining substantially parallel to a side edge of the windscreen when said wiper arm swivels about said swivelling axis in said second mode and said wiper blade remaining substantially parallel to said wiper arm when said wiper arm is pivoted about said bearing axis, in said first mode, into said rest position;

means for changing-over said wiper arm between swivelling around said swivelling axis in said second mode and pivoting around said bearing axis in said first mode, said changing-over means having an adjusting drive and a locking device for fixing said control element with respect to the vehicle when said wider arm is swivelled around said swivelling axis in said second mode, and fixing said control element with respect to the wiper arm when said wider arm is pivoted about said bearing axis in said first mode.

2. Windscreen wiper system according to claim 1, wherein said wiper arm comprises a first arm section connected to said bearing housing and a second arm section telescopically shiftable in the first arm section when said wiper arm is pivoted about said bearing axis in said second mode, said blade pivot bearing being mounted on the second arm section, and wherein shifting of the second arm section is controlled by said means for controlling said rotating drive of said wiper blade and is arrested when said control element is fixed to said wiper arm.

3. The wiper system according to claim 1, further comprising an adjusting device mounted on said bearing shaft for activating said locking device, said locking device including a locking pin that is shiftable in a direction parallel to the bearing shaft in the control element, and wherein the vehicle and the bearing housing each have an opening for the selective engagement of said locking pin.

4. The wiper system according to claim 1, wherein the adjusting drive is mounted in the bearing housing and activates the locking device, the locking device comprising two locking pins that are shiftable in a direction perpendicular to the bearing shaft, one of said locking pins being spring-loaded through the bearing shaft and a second of said locking pins being displaceable in the bearing housing, and wherein the control element has an opening in which the two locking pins are selectively inserted.

5. The wiper system according to claim 4, wherein the second of said locking pins includes a pivot shaft.

6. The wiper system according to claim 1, wherein said control element can swivel around the bearing axis when said control element is fixed with respect to the wiper arm in said first mode.

7. The wiper system according to claim 1, further comprising a spring-loaded control pin mounted in a displaceable manner in said control element; and a scanning element formed in said bearing housing, said scanning element including a control curve located above said control pin, said control pin bearing on said control curve.

8. The wiper system according to claim 1, wherein the rotating drive comprises:

a rotating disk onto which said wiper blade is mounted;

cable control means connected to said rotating disk and to said control element for rotating said rotating disk when said wiper is swivelled in said second mode.

9. A wiper system for a windscreen, particularly for passenger vehicles, said windscreen including upper and lower edges and two side edges, said system comprising:

a support for said wiper system fastened to the vehicle and comprising a swivelling shaft, said swivelling shaft defines a swivelling axis;

an elongated wiper arm having opposite ends, said wiper arm including a bearing housing at one end and a blade pivot bearing at the other end, said wiper arm having a first and a second arm section, said first arm section being connected to said bearing housing, said second arm section being telescopically shiftable in the first arm section and coupled to a shifting drive, said blade pivot bearing being provided on a free end of the second arm section, said shifting drive being connected to a control means for controlling the shifting drive, said control means comprising a control element mounted on said swivelling shaft to be pivotable relative to said bearing housing, said bearing housing being connected to said swivelling shaft, said system having two modes of operation wherein in a first mode the wiper arm is pivotable about the swivelling axis over a first angle and in a second mode the wiper arm is pivotable about the swivelling axis over a second angle, said wiper arm being capable of being swivelled in said second mode through a central working position in which the wiper arm is at its shortest length, thereby shifting the second arm section past the central working position, said wiper arm also being capable of being pivoted in said first mode from said central working position into a rest position in a region of a lower edge of the windscreen;

an elongated wiper blade coupled with a rotating drive mounted in the blade pivot bearing, said rotating drive being connected to said control means simultaneously controlling the rotating drive of the wiper blade and the shifting drive of said second arm section, said wiper blade travelling substantially parallel to a side edge of the windscreen when said wiper arm swivels about said swivelling axis in said second mode and remaining substantially parallel to said wiper arm when said wiper arm is pivoted into said rest position in said first mode;

a wiping drive coupled to a drive pin provided on said bearing housing at a distance from the swivelling shaft; and means for changing-over said wiper arm between swivelling around said swivelling axis in said second mode and pivoting into said rest position in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted in said first mode.

10. The wiper system according to claim 9, wherein the adjusting drive is mounted in the bearing housing and activates the locking device, the locking device comprising two locking pins that are shiftable in a direction perpendicular to the bearing shaft, one of said locking pins being arranged spring-loaded through the bearing shaft and a second of said locking pins being displaceable in said bearing housing, and wherein said control element has an opening, in which the two locking pins are selectively inserted.

11. The wiper system according to claim 10, wherein the second of said locking pins includes a pivot shaft.

12. The wiper system according to claim 9, further comprising:

a spring-loaded control pin mounted in a displaceable manner in said control element and;

a scanning element formed in said bearing housing, said scanning element including a control curve located above said control pin, said control pin bearing on said control curve.

13. The wiper system according to claim 9, wherein the rotating drive comprises:

a rotating disk onto which said wiper blade is mounted;

cable control means connected to said rotating disk and to said control element for rotating said rotating disk when said wiper arm is swivelled in said second mode.

14. A wiper system for a windscreen, particularly for passenger vehicles, said windscreen having upper and lower edges and two side edges, said system comprising:

means for supporting the wiper system on the vehicle, said means for supporting including a bearing shaft which defines a bearing axis, a control element mounted on said bearing shaft, and a swivelling shaft mounted on said control element, said swivelling shaft defines a swivelling axis, said bearing shaft and said swivelling shaft being parallel to and spaced apart from each other;

an elongated wiper arm having opposite ends, said wiper arm including a bearing housing at one end and a free end part having a blade pivot bearing at the other end, said bearing housing being connected to said swivelling shaft so that said control element is pivotable relative to said bearing housing, said system having two modes of operation wherein in a first mode the arm is pivotable about the bearing axis and in a second mode the arm is pivotable about the swivelling axis, said wiper arm being capable of being swivelled in said second mode about said swivelling axis through a central working position, said wiper arm also being capable of being pivoted in said first mode about said bearing axis from said central working position into a rest position in a region of said lower edge of the windscreen;

an elongated wiper blade coupled with a rotating drive, said drive being mounted in the blade pivot bearing, said rotating drive being connected to a means for controlling the rotating drive, said means for controlling the rotating drive being mounted in said bearing housing and comprising said control element, said wiper blade travelling substantially parallel to a side edge of the windscreen when said wiper arm swivels about said swivelling axis in said second mode and said wiper blade remaining substantially parallel to said wiper arm when said wiper arm is pivoted about said bearing axis, in said first mode, into said rest position;

a wiping drive coupled to a drive pin mounted on said bearing housing at a first distance from said bearing shaft and at a second distance from said swivelling shaft, said first distance being less than said second distance when said wiper arm is in said central working position; and means for changing-over said wiper arm between swivelling around said swivelling axis in said first mode and pivoting around said bearing axis in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted about said bearing axis in said first mode.

15. The wiper system according to claim 14 wherein said adjusting drive is mounted on said bearing shaft for activating said locking device, said locking device including a locking pin that is shiftable in a direction parallel to the bearing shaft in said control element, and wherein the vehicle and the bearing housing each have an opening for the selective engagement of said locking pin.

16. The wiper system according to claim 14 wherein said control element can swivel around the bearing axis when said control element is fixed with respect to the wiper arm in said first mode.

17. The wiper system according to claim 14, further comprising:

a spring-loaded control pin mounted in a displaceable manner in said control element and a scanning element formed in said bearing housing, said scanning element including a control curve located above said control pin, said control pin bearing on said curve.

18. The wiper system according to claim 14, wherein the rotating drive comprises:

a rotating disk onto which said wiper blade is mounted;

cable control means connected to said rotating disk and to said control element for rotating said rotating disk when said wiper arm is swivelled in said second mode.

19. A wiper system for a windscreen particularly for passenger vehicles, said windscreen having upper and lower edges and two side edges, said system comprising:

means for supporting the wiper system on the vehicle, said means for supporting including a bearing shaft which defines a bearing axis, a control element mounted on said bearing shaft, and a swivelling shaft mounted on said control element, said swivelling shaft defines a swivelling axis, said bearing shaft and said swivelling shaft being parallel to and spaced apart from each other;

an elongated wiper arm having opposite ends, said wiper arm including a bearing housing at one end and a free end part having an elongated wiper blade at the other end, said bearing housing being connected to said swivelling shaft so that said control element is pivotable relative to said bearing housing, said system having two modes of operation wherein in a first mode the wiper arm is pivotable about the bearing axis and in a second mode the wiper arm is pivotable about the swivelling axis, said wiper arm being capable of being swivelled in said second mode about said swivelling axis through a central working position, said wiper arm also being capable of being pivoted in said first mode about said bearing axis from said central working position into a rest position in a region of said lower edge of the windscreen;

a wiping drive coupled to a drive pin mounted in said bearing housing at a first distance from said bearing shaft and at a second distance from said swivelling shaft, said first distance being less than said second distance when said wiper arm is in said central working position; and means for changing-over said wiper arm between swivelling around said swivelling axis in said second mode and pivoting around said bearing axis in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted about said bearing axis in said first mode.

20. The wiper system according to claim 19, further comprising an adjusting device mounted on said bearing shaft for activating said locking device, said locking device including a locking pin that is shiftable in a direction parallel to the bearing shaft in the control element, and wherein the vehicle and the bearing housing each have an opening for the selective engagement of said locking pin.

21. The wiper system according to claim 19, wherein said control element can swivel around the bearing axis when said control element is fixed with respect to the wiper arm in said first mode.

22. A wiper system for a windscreen, particularly for passenger vehicles, said windscreen having upper and lower edges and two side edges, said system comprising:

means for supporting the wiper system on the vehicle, said means for supporting including a bearing shaft which defines a bearing axis, a control element mounted on said bearing shaft, and a swivelling shaft mounted on said control element, said swivelling shaft defines a swivelling axis, said bearing shaft and said swivelling shaft being parallel to and spaced apart from each other;

an elongated wiper arm having opposite ends, said wiper arm including a bearing housing at one end and an elongated wiper blade at the other end, said wiper arm having a first and a second arm section, said first arm section being connected to said bearing housing, said second arm section being telescopically shiftable in the first arm section and coupled to a shifting drive, said elongated wiper blade being provided on a free end of the second arm section, said shifting drive being connected to a control means for controlling the shifting drive, said control means comprising said control element, said bearing housing being connected to said swivelling shaft so that said control element is pivotable relative to said bearing housing, said system having two modes of operation wherein in a first mode the arm is pivotable about the bearing axis and in a second mode the arm is pivotable about the swivelling axis, said wiper arm being capable of being swivelled in said second mode about said swivelling axis through a central working position in which the wiper arm is at its shortest length, thereby shifting the second arm section past the central working position, said wiper arm also being capable of being pivoted in said first mode about said bearing axis from said central working position into a rest position in a region of a lower edge of the windscreen;

a wiping drive coupled to a drive pin mounted in said bearing housing at a first distance from said bearing shaft and at a second distance from said swivelling shaft, said first distance being less than said second distance when said wiper arm is in said central working position; and means for changing-over said wiper arm between swivelling around said swivelling axis in said second mode and pivoting around said bearing axis in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted about said bearing axis in said first mode.

23. The wiper system according to claim 22, further comprising an adjusting device mounted on said bearing shaft for activating said locking device, said locking device including a locking pin that is shiftable in a direction parallel to the bearing shaft in the control element, and wherein the vehicle and the bearing housing each have an opening for the selective engagement of said locking pin.

24. The wiper system according to claim 22, further comprising:

a spring-loaded control pin mounted in a displaceable manner in said control element; and a scanning element formed in said bearing housing, said scanning element including a control curve being located above said control pin, said control pin bearing on said control curve.

25. A wiper system for a windscreen, particularly for passenger vehicles, said windscreen having upper and lower edges and two side edges, said system comprising:

means for supporting the wiper system on the vehicle, said means for supporting including a bearing shaft which defines a bearing axis, a control element mounted on said bearing shaft, and a swivelling shaft mounted on said control element, said swivelling shaft defines a swivelling axis, said bearing shaft and said swivelling shaft being parallel to and spaced apart from each other;

an elongated wiper arm having opposite ends, said wiper arm including a bearing housing at one end and a blade pivot bearing at the other end, said wiper arm having a first and a second arm section, said first arm section being connected to said bearing housing, said second arm section being telescopically shiftable in the first arm section and coupled to a shifting drive, said blade pivot bearing being provided on a free end of the second arm section, said shifting drive being connected to a control means for controlling the shifting drive, said control means comprising said control element, said bearing housing being connected to said swivelling shaft, said system having two modes of operation wherein in a first mode the arm is pivotable about the bearing axis and in a second mode the arm is pivotable about the swivelling axis, said wiper arm being capable of being swivelled in said second mode about said swivelling axis through a central working position in which the wiper arm is at its shortest length, thereby shifting the second arm section past the central working position, said wiper arm also being capable of being pivoted in said first mode about said bearing axis from said central working position into a rest position in a region of a lower edge of the windscreen;

an elongated wiper blade coupled with a rotating drive mounted in the blade pivot bearing, said rotating drive being connected to said control means simultaneously controlling the rotating drive of the wiper blade and the shifting drive of said second arm section, said wiper blade travelling substantially parallel to a side edge of the windscreen when said wiper arm swivels about said swivelling axis in said second mode and remaining substantially parallel to said wiper arm when said wiper arm is pivoted into said rest position in said first mode;

a wiping drive coupled to a drive pin mounted in said bearing housing at a first distance from said bearing shaft and at a second distance from said swivelling shaft, said first distance being less than said second distance when said wiper arm is in said central working position; and means for changing-over said wiper arm between swivelling around said swivelling axis in said second mode and pivoting around said bearing axis in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted about said bearing axis in said first mode.

26. The wiper system according to claim 25, further comprising an adjusting device mounted on said bearing shaft for activating said locking device, said locking device including a locking pin that is shiftable in a direction parallel to the bearing shaft in the control element, and wherein the vehicle and the bearing housing each have an opening for the selective engagement of locking pin.

27. The wiper system according to claim 25, further comprising
- a spring-loaded control pin mounted in a displaceable manner in said control element; and
- a scanning element formed in said bearing housing, said scanning element including a control curve located above said control pin, said control pin bearing on said curve.

28. The wiper system according to claim 25, wherein the rotating drive comprises:
- a rotating disk onto which said wiper blade is mounted;
- cable control means connected to said rotating disk and to said control element for rotating said rotating disk when said wiperarm is swivelled in said second mode.

29. A wiper system for a windscreen, particularly for passenger vehicles, said windscreen including upper and lower edges and two side edges, said system comprising:
- a support for said wiper system fastened to the vehicle and comprising a swivelling shaft, said swivelling shaft defines a swivelling axis;
- an elongated wiper arm having opposite ends, said wiper arm including a bearing housing at one end a free end part having a blade pivot bearing at the other end, said bearing housing being connected to said swivelling shaft, said system having two modes of operation wherein in a first mode the wiper arm is pivotable about the swivelling axis over a first angle and in a second mode the wiper arm is pivotable through a second angle, said wiper arm being capable of being swivelled in said second mode through a central working position, said wiper arm also being capable of being pivoted in said first mode from said central working position into a rest position in a region of a lower edge of the windscreen;
- an elongated wiper blade coupled with a rotating drive mounted in the blade pivot bearing, said rotating drive being connected to a control means for controlling the rotating drive, said control means being mounted in said bearing housing and comprising a control element mounted on said swivelling shaft to be pivotable relative to said bearing housing, said wiper blade travelling substantially parallel to a side edge of the windscreen when said wiper arm swivels about said swivelling axis in said second mode and said wiper blade remaining substantially parallel to said wiper arm when said wiper arm is pivoted into said rest position in said first mode;
- a wiping drive coupled to a drive pin provided on said bearing housing at a distance from the swivelling shaft;
- and means for changing-over said wiper arm between swivelling around said swivelling axis in said second mode and pivoting into said rest position in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted in said first mode.

30. The wiper system according to claim 29 further comprising:
- a spring-loaded control pin mounted in a displaceable manner in said control element; and
- a scanning element formed in said bearing housing, said scanning element including a control curve located above said control pin, said control pin bearing on said curve.

31. The wiper system according to claim 29, wherein the rotating drive comprises:
- a rotating disk onto which said wiper blade is mounted;
- a cable control means connected to said rotating disk and to said control element for rotating said rotating disk when said wiperarm is swivelled in said second mode.

32. A wiper system for a windscreen, particularly for passenger vehicles, said windscreen including upper and lower edges and two side edges, said system comprising:
- a support for said wiper system fastened to the vehicle and comprising a swivelling shaft, said swivelling shaft defines a swivelling axis;
- an elongated wiper arm having opposite ends, said wiper arm including a bearing housing at one end and an elongated wiper blade at the other end, said wiper arm having a first and a second arm section, said first arm section being connected to said bearing housing, said second arm section being telescopically shiftable in the first arm section and coupled to a shifting drive, said elongated wiper blade being provided on a free end of the second arm section, said shifting drive being connected to a control means for controlling the shifting drive, said control means comprising a control element mounted on said swivelling shaft to be pivotable relative to said bearing housing, said bearing housing being connected to said swivelling shaft, said system having two modes of operation wherein in a first mode the wiper arm is pivotable about the swivelling axis over a first angle and in a second mode the wiper arm is pivotable about the swivelling axis over a second angle, said wiper arm being capable of being swivelled in said second mode through a central working position in which the wiper arm is at its shortest length, thereby shifting the second arm section past the central working position, said wiper arm also being capable of being pivoted in said first mode from said central working position into a rest position in a region of a lower edge of the windscreen;
- a wiping drive coupled to a drive pin provided on said bearing housing at a distance from the swivelling shaft;
- and means for changing-over said wiper arm between swivelling around said swivelling axis in said second mode and pivoting into said rest position in said first mode, said changing-over means having an adjusting drive and a locking device for fixing said control element with respect to the vehicle when said wiper arm is swivelled around said swivelling axis in said second mode, and fixing said control element with respect to the wiper arm when said wiper arm is pivoted in said first mode.

33. The wiper system according to claim 32 further comprising:
- a spring-loaded control pin mounted in a displaceable manner in said control element; and
- a scanning element formed in said bearing housing, said scanning element including a control curve located above said control pin, said control pin bearing on said curve.

\* \* \* \* \*